United States Patent
Weitz et al.

(10) Patent No.: US 11,517,864 B2
(45) Date of Patent: Dec. 6, 2022

(54) SCALE-UP OF MICROFLUIDIC DEVICES

(71) Applicant: President and Fellows of Harvard College, Cambridge, MA (US)

(72) Inventors: David A. Weitz, Bolton, MA (US); Mark Romanowsky, Cambridge, MA (US); Adam R. Abate, Daly City, CA (US)

(73) Assignee: President and Fellows of Harvard College, Cambridge, MA (US)

( * ) Notice: Subject to any disclaimer, the term of this patent is extended or adjusted under 35 U.S.C. 154(b) by 404 days.

(21) Appl. No.: 16/667,294

(22) Filed: Oct. 29, 2019

(65) Prior Publication Data
US 2020/0306706 A1    Oct. 1, 2020

Related U.S. Application Data

(63) Continuation of application No. 15/288,135, filed on Oct. 7, 2016, now Pat. No. 10,518,230, which is a
(Continued)

(51) Int. Cl.
*B01F 33/3011* (2022.01)
*B01L 3/00* (2006.01)
(Continued)

(52) U.S. Cl.
CPC .......... *B01F 33/3011* (2022.01); *B01F 23/41* (2022.01); *B01F 23/4105* (2022.01);
(Continued)

(58) Field of Classification Search
CPC .............. B01F 33/3011; B01F 2101/23; B01F 23/4105; B01F 23/41; B01J 19/0093;
(Continued)

(56) References Cited

U.S. PATENT DOCUMENTS

| | | |
|---|---|---|
| 5,149,625 A | 9/1992 | Church et al. |
| 5,846,396 A | 12/1998 | Zanzucchi et al. |

(Continued)

FOREIGN PATENT DOCUMENTS

| | | |
|---|---|---|
| CN | 1984709 A | 6/2007 |
| EP | 1019496 B1 | 9/2004 |

(Continued)

OTHER PUBLICATIONS

Brazilian Office Action dated Jan. 11, 2018 for Application No. PI1008965-9.
(Continued)

*Primary Examiner* — Brian J. Sines
(74) *Attorney, Agent, or Firm* — Wolf, Greenfield & Sacks, P.C.

(57) ABSTRACT

Parallel uses of microfluidic methods and devices for focusing and/or forming discontinuous sections of similar or dissimilar size in a fluid are described. In some aspects, the present invention relates generally to flow-focusing-type technology, and also to microfluidics, and more particularly parallel use of microfluidic systems arranged to control a dispersed phase within a dispersant, and the size, and size distribution, of a dispersed phase in a multi-phase fluid system, and systems for delivery of fluid components to multiple such devices.

27 Claims, 9 Drawing Sheets

Related U.S. Application Data continuation of application No. 14/710,223, filed on May 12, 2015, now Pat. No. 9,486,757, which is a continuation of application No. 13/255,342, filed as application No. PCT/US2010/000753 on Mar. 12, 2010, now Pat. No. 9,056,299.

(60) Provisional application No. 61/223,627, filed on Jul. 7, 2009, provisional application No. 61/160,184, filed on Mar. 13, 2009.

(51) Int. Cl.
  *B01F 23/41* (2022.01)
  *B01J 19/00* (2006.01)
  *B01F 101/23* (2022.01)

(52) U.S. Cl.
  CPC ..... *B01J 19/0093* (2013.01); *B01L 3/502784* (2013.01); *B01F 2101/23* (2022.01); *B01J 2219/00015* (2013.01); *B01J 2219/0097* (2013.01); *B01J 2219/00783* (2013.01); *B01J 2219/00828* (2013.01); *B01J 2219/00831* (2013.01); *B01J 2219/00833* (2013.01); *B01J 2219/00837* (2013.01); *B01J 2219/00889* (2013.01); *B01J 2219/00891* (2013.01); *B01J 2219/00975* (2013.01); *B01L 2200/0636* (2013.01); *B01L 2200/0673* (2013.01); *B01L 2300/0816* (2013.01); *B01L 2300/0861* (2013.01); *Y10T 137/0318* (2015.04); *Y10T 137/8593* (2015.04)

(58) Field of Classification Search
  CPC ......... B01L 3/502784; Y10T 137/0318; Y10T 137/8593
  See application file for complete search history.

(56) References Cited

U.S. PATENT DOCUMENTS

| | | | |
|---|---|---|---|
| 5,851,769 A | 12/1998 | Gray et al. | |
| 6,167,910 B1 | 1/2001 | Chow | |
| 6,268,219 B1 | 7/2001 | McBride et al. | |
| 6,368,562 B1 | 4/2002 | Yao | |
| 6,524,456 B1 | 2/2003 | Ramsey et al. | |
| 6,645,432 B1 | 11/2003 | Anderson et al. | |
| 6,827,095 B2 | 12/2004 | O'Connor et al. | |
| 6,981,522 B2 | 1/2006 | O'Connor et al. | |
| 7,041,481 B2 | 5/2006 | Anderson et al. | |
| 7,268,167 B2 | 9/2007 | Higuchi et al. | |
| 7,638,276 B2 | 12/2009 | Griffiths et al. | |
| RE41,780 E | 9/2010 | Anderson et al. | |
| 7,968,287 B2 | 6/2011 | Griffiths et al. | |
| 8,252,539 B2 | 8/2012 | Quake et al. | |
| 8,273,573 B2 | 9/2012 | Ismagilov et al. | |
| 8,278,071 B2 | 10/2012 | Brown et al. | |
| 8,329,407 B2 | 12/2012 | Ismagilov et al. | |
| 8,632,734 B2 | 1/2014 | Barthe et al. | |
| 8,748,102 B2 | 6/2014 | Berka et al. | |
| 8,765,380 B2 | 7/2014 | Berka et al. | |
| 8,871,444 B2 | 10/2014 | Griffiths et al. | |
| 9,056,299 B2 | 6/2015 | Romanowsky et al. | |
| 9,486,757 B2 | 11/2016 | Romanowsky et al. | |
| 10,518,230 B2 | 12/2019 | Weitz et al. | |
| 2004/0185484 A1 | 9/2004 | Costa et al. | |
| 2004/0233424 A1 | 11/2004 | Lee et al. | |
| 2005/0123450 A1 | 6/2005 | Gilbert et al. | |
| 2005/0221339 A1 | 10/2005 | Griffiths et al. | |
| 2005/0267270 A1 | 12/2005 | Fitzgerald et al. | |
| 2005/0272159 A1 | 12/2005 | Ismagilov et al. | |
| 2006/0078888 A1 | 4/2006 | Griffiths et al. | |
| 2006/0153924 A1 | 7/2006 | Griffiths et al. | |
| 2006/0196771 A1 | 9/2006 | Munson et al. | |
| 2007/0092914 A1 | 4/2007 | Griffiths et al. | |
| 2007/0105972 A1 | 5/2007 | Doyle et al. | |
| 2007/0172873 A1 | 7/2007 | Brenner et al. | |
| 2007/0246106 A1 | 10/2007 | Tonkovich et al. | |
| 2008/0003142 A1 | 1/2008 | Link et al. | |
| 2008/0004436 A1 | 1/2008 | Tawfik et al. | |
| 2008/0014589 A1 | 1/2008 | Link et al. | |
| 2008/0223720 A1 | 9/2008 | Yamanaka et al. | |
| 2008/0226516 A1 | 9/2008 | Suzuki et al. | |
| 2009/0068170 A1 | 3/2009 | Weitz et al. | |
| 2009/0197772 A1 | 8/2009 | Griffiths et al. | |
| 2009/0246086 A1 | 10/2009 | Barbier et al. | |
| 2009/0286687 A1 | 11/2009 | Dressman et al. | |
| 2010/0022414 A1 | 1/2010 | Hutchinson et al. | |
| 2010/0130369 A1 | 5/2010 | Shenderov et al. | |
| 2010/0137163 A1 | 6/2010 | Link et al. | |
| 2010/0173294 A1 | 7/2010 | Langland et al. | |
| 2010/0173394 A1 | 7/2010 | Colston, Jr. et al. | |
| 2010/0184928 A1 | 7/2010 | Kumacheva | |
| 2010/0210479 A1 | 8/2010 | Griffiths et al. | |
| 2011/0086780 A1 | 4/2011 | Colston, Jr. et al. | |
| 2011/0092392 A1 | 4/2011 | Colston, Jr. et al. | |
| 2011/0151578 A1 | 6/2011 | Abate et al. | |
| 2011/0160078 A1 | 6/2011 | Fodor et al. | |
| 2012/0015382 A1 | 1/2012 | Weitz et al. | |
| 2012/0121481 A1 | 5/2012 | Romanowsky et al. | |
| 2012/0190032 A1 | 7/2012 | Ness et al. | |
| 2012/0220494 A1 | 8/2012 | Samuels et al. | |
| 2012/0220497 A1 | 8/2012 | Jacobson et al. | |
| 2013/0079231 A1 | 3/2013 | Pushkarev et al. | |
| 2013/0109575 A1 | 5/2013 | Kleinschmidt et al. | |
| 2013/0157899 A1 | 6/2013 | Adler, Jr. et al. | |
| 2013/0210639 A1 | 8/2013 | Link et al. | |
| 2013/0260447 A1 | 10/2013 | Link | |
| 2013/0274117 A1 | 10/2013 | Church et al. | |
| 2014/0155295 A1 | 6/2014 | Hindson et al. | |
| 2014/0227684 A1 | 8/2014 | Hindson et al. | |
| 2014/0235506 A1 | 8/2014 | Hindson et al. | |
| 2014/0378349 A1 | 12/2014 | Hindson et al. | |
| 2015/0005200 A1 | 1/2015 | Hindson et al. | |

FOREIGN PATENT DOCUMENTS

| | | |
|---|---|---|
| EP | 1810746 A1 | 7/2007 |
| EP | 1482036 B1 | 10/2007 |
| EP | 1594980 B1 | 11/2009 |
| EP | 1967592 B1 | 4/2010 |
| EP | 2258846 A2 | 12/2010 |
| EP | 2145955 B1 | 2/2012 |
| EP | 1905828 B1 | 8/2012 |
| EP | 1908832 B1 | 12/2012 |
| EP | 2540389 A1 | 1/2013 |
| JP | 2005-279523 A | 10/2005 |
| JP | 2006-507921 A | 3/2006 |
| JP | 2006-281008 A | 10/2006 |
| JP | 2008-80330 A | 4/2008 |
| WO | WO 99/02671 A1 | 1/1999 |
| WO | WO 2003/037502 A1 | 5/2003 |
| WO | WO 2004/002627 A2 | 1/2004 |
| WO | WO 2007/039265 A1 | 4/2007 |
| WO | WO 2008/121342 A2 | 10/2008 |
| WO | WO 2008/134153 A1 | 11/2008 |
| WO | WO 2009/153115 A1 | 12/2009 |
| WO | WO 2010/104597 A2 | 9/2010 |
| WO | WO 2012/048341 A1 | 4/2012 |
| WO | WO 2013/177220 A1 | 11/2013 |

OTHER PUBLICATIONS

Chinese Office Action for Application No. CN 201080017038.X dated Jul. 10, 2013.
Chinese Office Action dated Apr. 22, 2014 for Application No. 201080017038.X.
Chinese Notification of Re-examination for Application No. 201080017038.X dated Feb. 16, 2015.
Chinese Office Action for Application No. CN 201080017038.X dated Sep. 6, 2015.
European Office Communication dated Feb. 7, 2018 for Application No. EP 10710476.2.

(56) References Cited

OTHER PUBLICATIONS

European Office Action dated Jan. 7, 2020 for Application No. EP 10710476.2.
Indian Examination Report dated May 16, 2018 for Application No. 7823/DELNP/2011.
Japanese Office Action for Application No. 2011-554051 dated Jan. 7, 2014.
Japanese Decision of Refusal for Application No. 2011-554051 dated Mar. 3, 2015.
Japanese Office Action for Application No. JP 2011-554051 dated Nov. 10, 2015.
Japanese Office Action for Application No. JP 2015-134627 dated Jul. 5, 2016.
Japanese Office Action dated Apr. 18, 2017 for Application No. JP 2015-134627.
Japanese Office Action dated Feb. 20, 2018 for Application No. 2015-134627.
Korean Notice of Preliminary Rejection dated Dec. 21, 2016 for Application No. KR 10-2011-7023966.
International Search Report and Written Opinion dated Feb. 1, 2011 in International Application No. PCT/US2010/000753.
[No Author] Microfluidic ChipShop. Microfluidic product catalogue. Mar. 2005.
[No Author] Microfluidic ChipShop. Microfluidic product catalogue. Oct. 2009.
Barbier et al., Producing droplets in parallel microfluidic systems. Physical Review Oct. 23, 2006;74:046306-1-046306-4.
Beebe et al., Physics and Applications of Microfluidics in Biology. Annu Rev Biomed Eng. 2002;4:261-286.
Boone, et al. Plastic advances microfluidic devices. The devices debuted in silicon and glass, but plastic fabrication may make them hugely successful in biotechnology application. Analytical Chemistry. Feb. 2002; 78A-86A.
Chou, et al. Disposable Microdevices for DNA Analysis and Cell Sorting. Proc. Solid-State Sensor and Actuator Workshop, Hilton Head, SC. Jun. 8-11, 1998; 11-14.
Fu, et al. A microfabricated fluorescence-activated cell sorter. Nat Biotechnol. Nov. 1999;17(11): 1109-11.
Gaertner, et al. The Microfluidic Toolbox—examples for fluidic interfaces and standardization concepts. Proc. SPIE 4982, Microfluidics, BioMEMS, and Medical Microsystems, Jan. 17, 2003.
Ghadessy, et al. Directed evolution of polymerase function by compartmentalized self-replication. Proc Natl Acad Sci US A. Apr. 10, 2001;98(8):4552-7. Epub Mar. 27, 2001.
Holtze et al., Biocompatible surfactants for water-in-fluorocarbon emulsions. Lab Chip. Oct. 2008; 8(10):1632-9.
Hug, et al. Measurement of the number of molecules of a single mRNA species in a complex mRNA preparation. J Theor Biol. Apr. 21, 2003;221(4):615-24.
Mazutis et al., Selective droplet coalescence using microfluidic systems. Lab Chip. Apr. 24, 2012; 12(10): 1800-6.
Tawfik, et al. Man-made cell-like compartments for molecular evolution. Nat Biotechnol. Jul. 1998; 16(7):652-6.
Tetradis-Meris et al., Novel parallel integration of microfluidic device network for emulsion formation. Ind. Eng. Chem. Res., 2009; 48 (19): 8881-8889.
BR PI1008965-9, Jan. 11, 2018, Brazilian Office Action.
CN 201080017038.X, Jul. 10, 2013, Chinese Office Action.
CN 201080017038.X, Apr. 22, 2014, Chinese Office Action.
CN 201080017038.X, Feb. 16, 2015, Chinese Notification of Re-exam.
CN 201080017038.X, Sep. 6, 2015, Chinese Office Action.
EP 10710476.2, Feb. 7, 2018, European Office Action.
EP 10710476.2, Jan. 7, 2020, European Office Action.
IN7823/DELPNP/2011, May 16, 2018, Indian Examination Report.
JP 2011-554051, Jan. 7, 2014, Japanese Office Action.
JP 2011-554051, Mar. 3, 2015, Japanese Decision of Refusal.
JP 2011-554051, Nov. 10, 2015, Japanese Office Action.
JP 2011-554051, Jul. 5, 2016, Japanese Office Action.
JP 2015-134627, Apr. 18, 2017, Japanese Office Action.
JP 2015-134627, Feb. 20, 2018, Japanese Office Action.
KR 10-2011-7023966, Dec. 21, 2016, Korean Notice of Preliminary Rejection.
PCT/US2010/000753, Feb. 1, 2011, International Search Report and Written Opinion.
IN 7823/DELNP/2011, Aug. 17, 2020, Indian Office Action.
Indian Office Action dated Aug. 17, 2020 for Application No. IN 7823/DELNP/2011.

SCALE-UP OF MICROFLUIDIC DEVICES

RELATED APPLICATIONS

This application is a continuation of U.S. application Ser. No. 15/288,135, filed Oct. 7, 2016, entitled "Scale-Up of Microfluidic Devices," which is a continuation of U.S. patent application Ser. No. 14/710,223 filed on May 12, 2015, entitled "Scale-up of Microfluidic Devices," by Romanowsky, et al., which is a continuation of Ser. No. 13/255,342, with a § 371 date of Jan. 26, 2012, which is a national stage filing under 35 U.S.C. § 371 of International Patent Application Serial No. PCT/US2010/000753, filed Mar. 12, 2010, which claims the benefit of U.S. Provisional Patent Application Ser. No. 61/160,184, filed Mar. 13, 2009, entitled "Scale-up of Microfluidic Devices," by Romanowsky, et al., and of U.S. Provisional Patent Application Ser. No. 61/223,627, filed Jul. 7, 2009, entitled "Scale-up of Microfluidic Devices," by Romanowsky, et al., all of which are incorporated herein by reference.

FEDERALLY SPONSORED RESEARCH

This invention was made with government support under Grant No. DMR-0213805 awarded by the National Science Foundation. The government has certain rights in the invention.

FIELD OF THE INVENTION

The present invention relates generally to flow-focusing-type technology, and also to microfluidics, and more particularly parallel use of microfluidic systems arranged to control a dispersed phase within a dispersant, and the size, and size distribution, of a dispersed phase in a multi-phase fluid system, and systems for delivery of fluid components to multiple such devices.

BACKGROUND OF THE INVENTION

The manipulation of fluids to form fluid streams of desired configuration, discontinuous fluid streams, particles, dispersions, etc., for purposes of fluid delivery, product manufacture, analysis, and the like, is a relatively well-studied art. For example, highly monodisperse gas bubbles, less than 100 microns in diameter, have been produced using a technique referred to as capillary flow focusing. In this technique, gas is forced out of a capillary tube into a bath of liquid, the tube is positioned above a small orifice, and the contraction flow of the external liquid through this orifice focuses the gas into a thin jet which subsequently breaks into equal-sized bubbles via a capillary instability. In a related technique, a similar arrangement was used to produce liquid droplets in air.

Microfluidics is an area of technology involving the control of fluid flow at a very small scale. Microfluidic devices typically include very small channels, within which fluid flows, which can be branched or otherwise arranged to allow fluids to be combined with each other, to divert fluids to different locations, to cause laminar flow between fluids, to dilute fluids, and the like. Significant effort has been directed toward "lab-on-a-chip" microfluidic technology, in which researchers seek to carry out known chemical or biological reactions on a very small scale on a "chip," or microfluidic device. Additionally, new techniques, not necessarily known on the macro scale, are being developed using microfluidics. Examples of techniques being investigated or developed at the microfluidic scale include high-throughput screening, drug delivery, chemical kinetics measurements, combinatorial chemistry (where rapid testing of chemical reactions, chemical affinity, and micro structure formation are desired), as well as the study of fundamental questions in the fields of physics, chemistry, and engineering.

The field of dispersions is well-studied. A dispersion (or emulsion) is a mixture of two materials, typically fluids, defined by a mixture of at least two incompatible (immiscible) materials, one dispersed within the other. That is, one material is broken up into small, isolated regions, or droplets, surrounded by another phase (dispersant, or constant phase), within which the first phase is carried. Examples of dispersions can be found in many industries including the food and cosmetic industry. For example, lotions tend to be oils dispersed within a water-based dispersant. In dispersions, control of the size of droplets of dispersed phase can effect overall product properties, for example, the "feel" of a lotion.

Formation of dispersions typically is carried out in equipment including moving parts (e.g., a blender or device similarly designed to break up material), which can be prone to failure and, in many cases, is not suitable for control of very small dispersed phase droplets. Specifically, traditional industrial processes typically involve manufacturing equipment built to operate on size scales generally unsuitable for precise, small dispersion control. Membrane emulsification is one small scale technique using micron-sized pores to form emulsions. However, polydispersity of the dispersed phase can in some cases be limited by the pore sizes of the membrane.

Batch production of discontinuous fluids are prone to difficulties in product uniformity. These problems can be compounded for complex structures such as double emulsions (drops-in-drops) or triple emulsions (drops-in-drops-in-drops). A further difficulty for double or triple emulsions is poor encapsulation efficiency, where substantial amounts of the innermost phase leak out into the outermost phases, which can limit the usefulness of such emulsions as carriers for valuable or volatile compounds such as drugs, flavors, or fragrances. Microfluidic devices, by contrast, can produce multiple emulsions with extremely high uniformity and encapsulation efficiency, essentially by regulating emulsion formation on the individual-droplet level. Such control comes at the cost of forming emulsion droplets essentially one at a time, each microfluidic device producing only small amounts of product on the order of fractions of a milliliter per hour. The present invention in part involves appreciation of the need for scale-up of the products of microfluidic devices.

While many techniques involving control of multi-phase systems exists, there is a need for improvement in control of size of dispersed phase, size range (polydispersity), and other factors.

SUMMARY OF THE INVENTION

The present invention relates generally to flow-focusing-type technology, and also to microfluidics, and more particularly parallel use of microfluidic systems arranged to control a dispersed phase within a dispersant, and the size, and size distribution, of a dispersed phase in a multi-phase fluid system, and systems for delivery of fluid components to multiple such devices. The subject matter of the present invention involves, in some cases, interrelated products, alternative solutions to a particular problem, and/or a plurality of different uses of one or more systems and/or articles.

In one aspect, a method is provided. The methods comprises introducing a subject fluid into an inlet of a channel and expelling separate portions of the subject fluid from a plurality of microfluidic outlets each fluidly connected to the inlet, simultaneously, while surrounding at least one of the separate portions of the subject fluid at least in part with a dispersing fluid.

In another aspect, a system for forming droplets in microfluidic channels in parallel is provided. The system comprises a distribution channel having an inlet fluidly connected to a plurality of microfluidic subject fluid outlets, each outlet defining a portion of a microfluidic interconnected region in fluid communication with at least one dispersing fluid channel fluidly connectable to a source of a dispersing fluid.

In another aspect, a system for forming droplets in microfluidic channels in parallel is provided. The system comprises an interconnected region joining a subject fluid channel for carrying a subject fluid, and a dispersing fluid channel for carrying a dispersing fluid, wherein at least a portion defining an outer wall of the interconnected region and a portion defining an outer wall of the subject fluid channel are portions of a single integral unit.

The subject matter of this application may involve, in some cases, interrelated products, alternative solutions to a particular problem, and/or a plurality of different uses of a single system or article.

Other advantages, features, and uses of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION OF THE INVENTION

Figure 1:
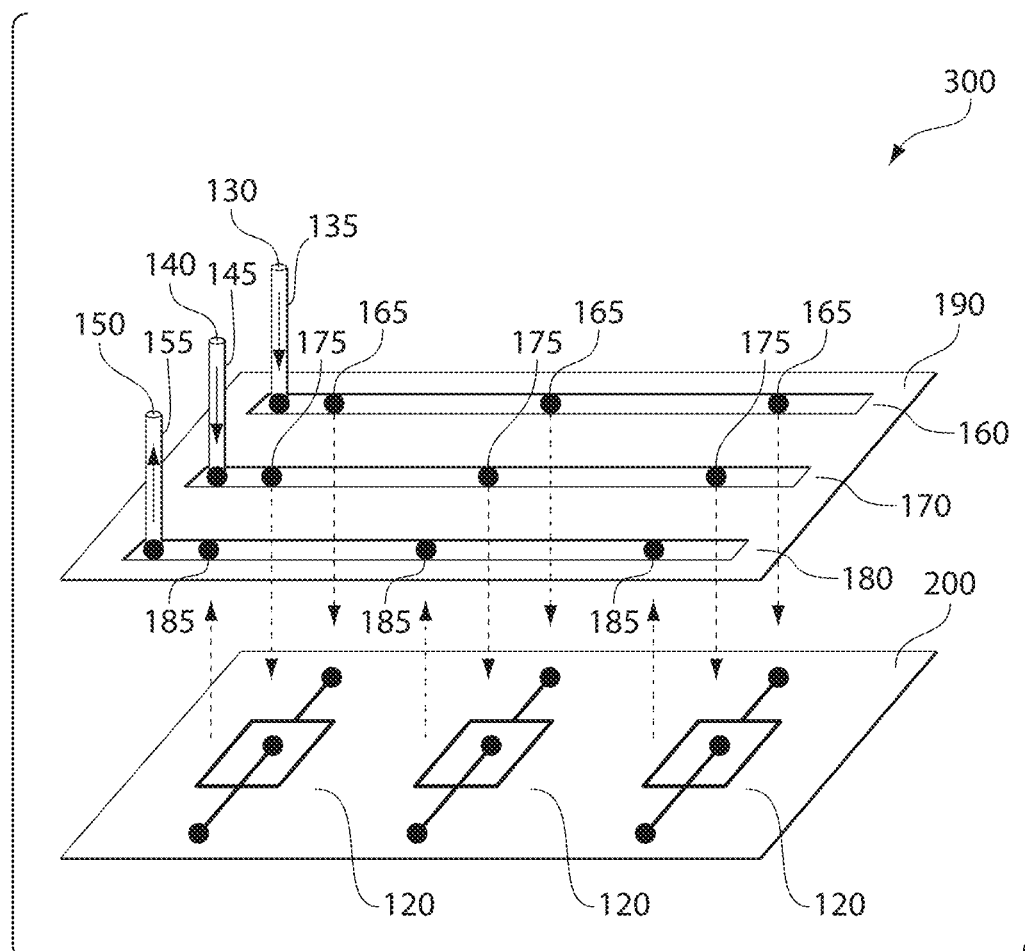
FIG. 1 is a schematic illustration of a fluid distribution article according to an embodiment.

The following documents are incorporated herein by reference in their entirety: U.S. Pat. No. 5,512,131, issued Apr. 30, 1996 to Kumar, et al.; International Patent Publication WO 96/29629, published Jun. 26, 1996 by Whitesides, et al.; U.S. Pat. No. 6,355,198, issued Mar. 12, 2002 to Kim, et al.; International Patent Publication WO 01/89787, published Nov. 29, 2001 by Anderson, et al.; International Patent Publication WO2004/091763, published Oct. 28, 2004 by Link et al.; International Patent Publication WO2004/002627, published Jan. 8, 2004 by Stone et al.; International Patent Publication WO2005/021151, published Mar. 10, 2005; WO2007/089541, published Aug. 9, 2007 by Ahn et al.; WO2008/121342, published Oct. 9, 2008 by Chu et al.; WO2006/096571 published Sep. 14, 2006 by Weitz et al. Also incorporated herein by reference are U.S. Provisional Patent Application Ser. No. 61/160,020, filed on Mar. 13, 2009, entitled "Controlled Creation of Emulsions, Including Multiple Emulsions," by Weitz, et al.; U.S. Provisional Patent Application Ser. No. 61/160,184, filed Mar. 13, 2009, entitled "Scale-up of Microfluidic Devices," by Romanowsky, et al.; and U.S. Provisional Patent Application Ser. No. 61/223,627, filed Jul. 7, 2009, entitled "Scale-up of Microfluidic Devices," by Romanowsky, et al.

Systems and techniques for parallel use of microfluidic methods and devices for focusing and/or forming discontinuous sections of similar or dissimilar size in a fluid are provided. In one aspect, a fluid distribution article is used to distribute fluid from one input to a plurality of outputs. Using the disclosed methods and articles, a plurality of microfluidic devices may be connected in three dimensions. Microfluidic systems and the techniques are described in which, in some cases, it can be important to control back pressure and flow rate such that a microfluidic process, such as droplet formation, can be carried out reproducibly and consistently across a variety of similar or identical process locations. This is challenging in a microfluidic environment and it is not seen where the prior art provides any ability to achieve this. The present invention does so. In some cases, channel dimensions are chosen that allow pressure variations within parallel devices to be substantially reduced.

In some embodiments, the present invention involves devices and techniques associated with manipulation of multiphase materials in parallel. While those of ordinary skill will recognize that any of a wide variety of materials including various numbers of phases can be manipulated in accordance with certain embodiments of the invention, various embodiments of the invention finds use, generally, with two-phase systems of incompatible fluids. A "fluid," as used herein, means any substance which can be urged to flow through devices described below to achieve the benefits discussed herein. Those of ordinary skill in the art will recognize which fluids have viscosity appropriate for use in accordance with various embodiments of the invention, i.e., which substances are "fluids." It should be appreciated that a substance may be a fluid, for purposes of certain embodiments of the invention, under one set of conditions but may, under other conditions, have viscosity too high for use as a fluid. Where the material or materials behave as fluids under at least one set of conditions compatible with certain embodiments of the invention, they are included as potential materials for manipulation.

In one set of embodiments, the present invention involves formation of drops of a dispersed phase within a dispersant, of controlled size and size distribution, in a flow system (preferably a microfluidic system) free of moving parts to create drop formation. That is, at the location or locations at which drops of desired size are formed, the device is free of components that move relative to the device as a whole to affect drop formation or size. For example, where drops of controlled size are formed, they are formed without parts that move relative to other parts of the device that define a channel within the drops flow. This can be referred to as "passive control" of drop size, or "passive breakup" where a first set of drops are broken up into smaller drops.

Parallel microfluidic devices can be used to produce large-scale quantities of product by integrating many individual devices onto the same monolithic chip. In some cases, a parallel microfluidic device can generate emulsions in quantities of liters per day per integrated chip, or even greater. For example, at least about 200 mL per day per integrated chip, at least about 1 L per day per integrated chip, at least about 2 L per day per integrated chip, at least about 5 L per day per integrated chip, at least about 50 L per day per integrated chip, at least about 500 L per day per integrated chip, or even more could be produced.

In some embodiments, parallel scale-up is accompanied by a fluid distribution article for inputting fluids to, and collecting product from, an array of devices. As described in more detail below, the fluid distribution article and array of devices can be fabricated using known methods. The fluid distribution article can be used to operate an arbitrary number of microfluidic devices with a minimum number of interfaces to external fluid supplies and collectors, connect a high density array of devices, and promote a long functioning lifetime of the integrated device through system redundancy. Referring now to FIG. 1, a one-dimensional parallel microfluidic system 300 according to one embodiment of the present invention is illustrated schematically. A fluid distribution article 190 is used to distribute fluid from inputs 130 and 140 to a parallel drop formation array 200, and the resulting emulsion formed by the drop formation array exits through output 150. The fluid distribution article allows fluid entering, for example, a single channel 135 to flow into channel 160 and be distributed to a plurality of channels 165, which enter the drop formation devices in system 200.

Figure 2:
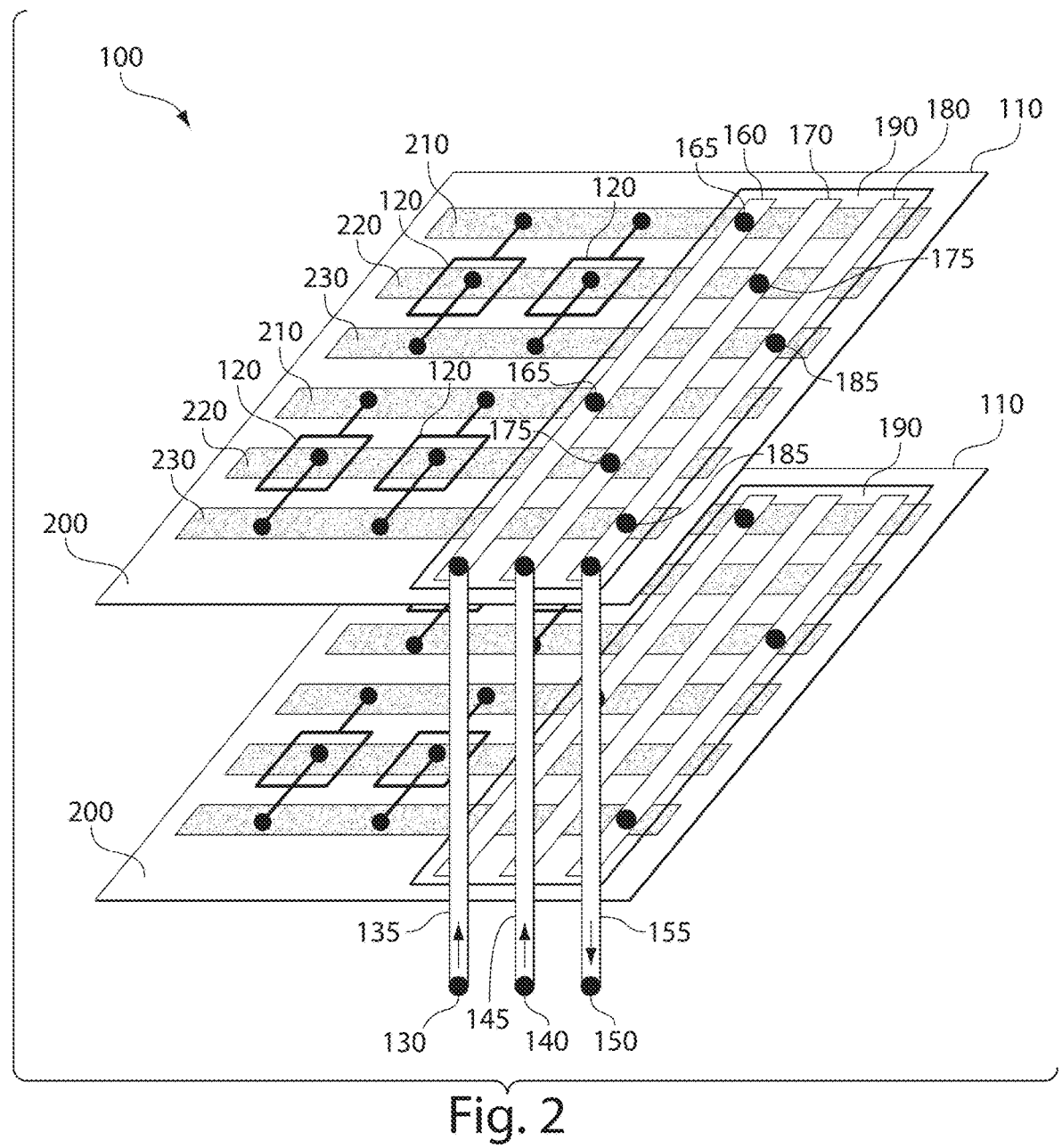
FIG. 2 is a schematic illustration of a three-dimensional parallel microfluidic device according to an embodiment.

FIG. 2, one embodiment of the present invention, illustrates schematically the assembly of three-dimensional parallel microfluidic system 100 of drop formation devices 120. System 100 includes two dimensional arrays 200 of drop formation devices 120. As described in FIG. 1, in this embodiment of the invention a first fluid (i.e., a dispersant fluid such as oil) is flowed through input 130 into channel 135, a second fluid is flowed through input 140 into channel 145, and an emulsion produced by the interaction of the first fluid and the second fluid in drop formation devices 120 flow out of the system through channel 155 and output 150. Distribution plate 190, which includes channels 160, 170, and 180, is in a different plane than the plane of the two-dimensional drop formation array 200, such that channels 160, 170, and 180 are in a different plane than cross-channels 210, 220, and 230. Channels 165, 175, and 185, connect channels 160, 170, and 180, respectively, to channels 210, 220, and 230, respectively.

Figure 3:
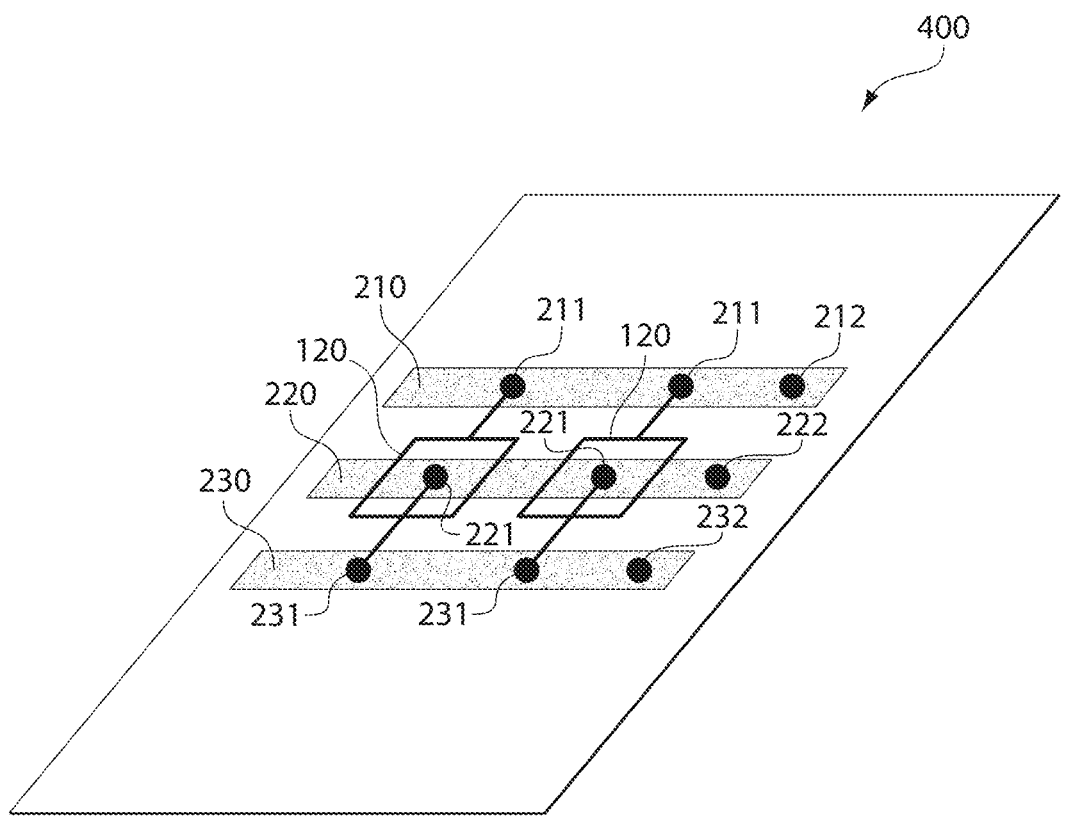
FIG. 3 is a schematic illustration of a one-dimensional parallel microfluidic device according to an embodiment.

In some embodiments, the fluid distribution article includes one or more layers of fluidic channels stacked above the layer(s) of microfluidic devices (FIG. 1). Although "top," "bottom," "above," "below," etc. are used to define certain portions and perspectives of systems of various embodiments of the invention, it is to be understood that the systems can be used in orientations different from those described. The fluid distribution article can serve one-dimensional (1-D), two-dimensional (2-D), and/or three-dimensional (3-D) arrays of devices in a scalable, parallel configuration. For example, a 1-D linear array of devices may be served by a single set of fluidic channels as shown in FIG. 3, which illustrates 1-D array 400 of microfluidic devices 120 in fluid communication with channels 210, 220, and 230. In this embodiment, channels 210, 220, and 230 are placed directly over the corresponding inlet or outlet of every device in the array, i.e., channel 210 supplying a first fluid to every device through inlets 211, channel 220 supplying a second fluid to every device through inlets 221, and channel 230 collecting the product from each device from outlets 231. In some embodiments, the fluid distribution article channels have at least one aperture each (e.g., apertures 212, 222, and 232) on the top side of the channel for supplying fluid to the corresponding channels and/or collecting product from the corresponding channels.

Figure 4:
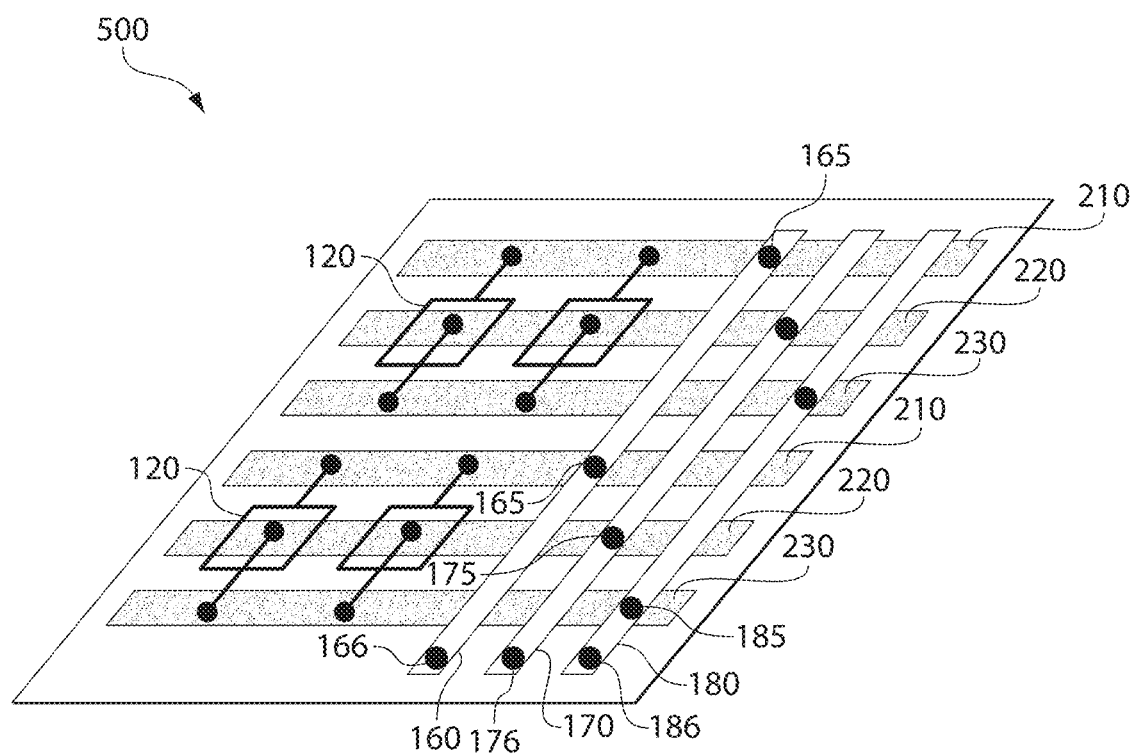
FIG. 4 is a schematic illustration of a two-dimensional parallel microfluidic device according to an embodiment.

A similar design can be used to create a 2-D array of devices with each 1-D sub-array served by its own set of distribution channels as shown in FIG. 4, which depicts a 2-D array 500 of microfluidic devices 120, a first set of distribution channels 210, 220, and 230 in fluid communication with each 1-D array of devices, and a second set of distribution channels 160, 170, and 180 in fluid communication with the first set of distribution channels 210, 220, and 230, respectively. Channels 160, 170, and 180 may have at least two sets of apertures, a first set of apertures 165, 175, and 185 that connect channels 160, 170, and 180 to channels 210, 220, and 230, respectively, and a second set of apertures 166, 167, and 168 through which fluid can flow into array 500 and/or product can be collected from array 500.

In some embodiments, the distribution channels in each set of distribution channels are incorporated into a single layer. Thus, 2-D array 500 can be constructed by fabricating devices 120 in a first layer, distribution channels 210, 220, and 230 in a second layer on top of the first layer, and distribution channels 160, 170, and 180 in a third layer on top of the second layer. Those skilled in the art will recognize that the order of assembly may be different.

In some cases, a 3-D array is constructed by connecting units of 2-D arrays, as shown in FIG. 2. In some embodiments, a set of distribution channels (e.g., channels 135, 145, and 155 in FIG. 2) are used to fluidically connect units of 2-D arrays. A 3-D array may be constructed in a variety of conformations, for example by stacking 2-D arrays, placing 2-D arrays side-by-side, etc. As shown in FIG. 2, array 100 may be operated with a single set of inputs and/or outputs 130, 140, and 150.

Figure 8:
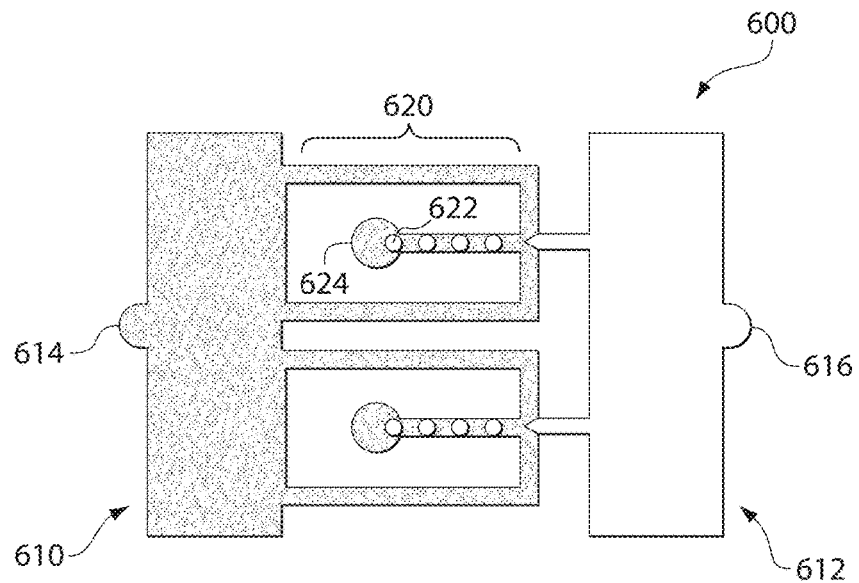
FIG. 8 is a schematic illustration of a parallel microfluidic device according to an embodiment.
Figure 9:
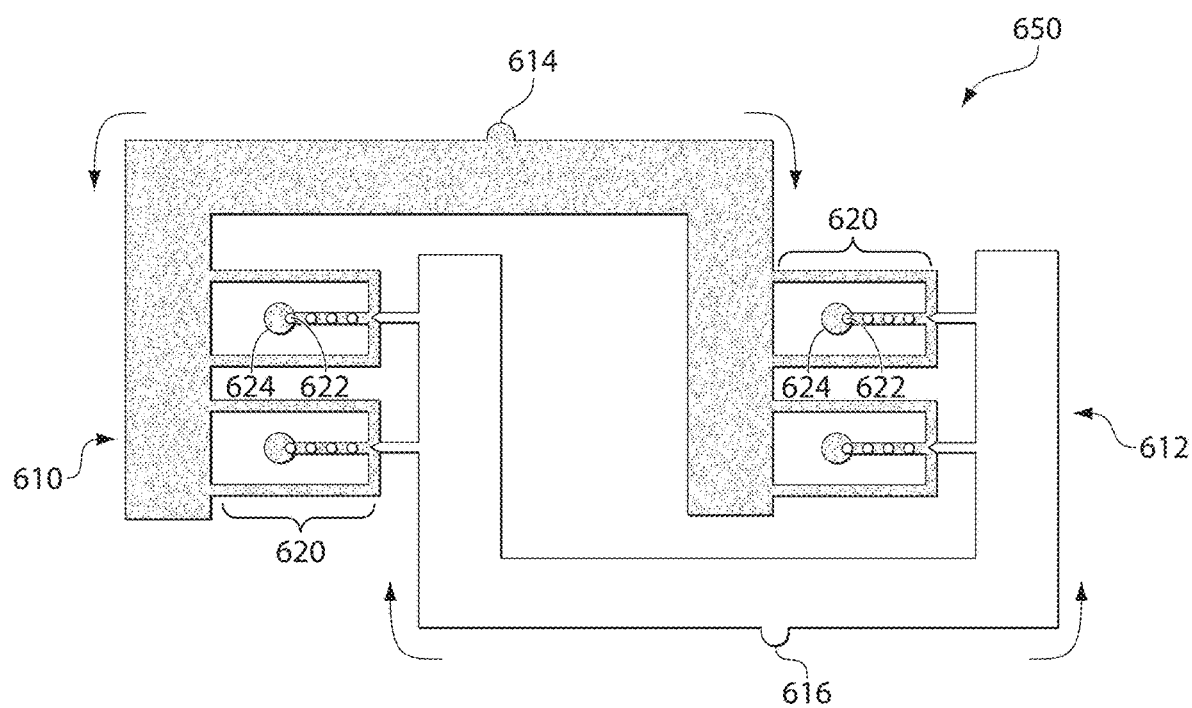
FIG. 9 is a schematic illustration of a parallel microfluidic device according to an embodiment.

In some embodiments, distribution channels and devices may be incorporated in a single layer. A non-limiting example is shown in FIG. 8, which illustrates an array 600 with two distribution channels 610 and 612 that serve two devices 620. In this example, distribution channel 610 contains a continuous phase (e.g., an oil) fed by an inlet 614, and distribution channel 612 contains a dispersed phase (e.g., an aqueous solution) fed by an inlet 616. The distribution channels feed into droplet-making devices 620, and the droplets 622 exit the devices through outlets 624. It should be understood that more than two devices may be operated using the layout depicted in FIG. 8, for example, by replicating additional devices 620 side-by-side and extending distribution channels 610 and 612 along their respective longitudinal axes. It should also be understood that arrangements other than linear arrangements may be used. For example, one or more of the devices and/or distribution channels may be curved or bent. For instance, distribution channels 610 and 612 and devices 620 may be arranged as shown in FIG. 9, which illustrates two-dimensional array 650.

Figure 10:
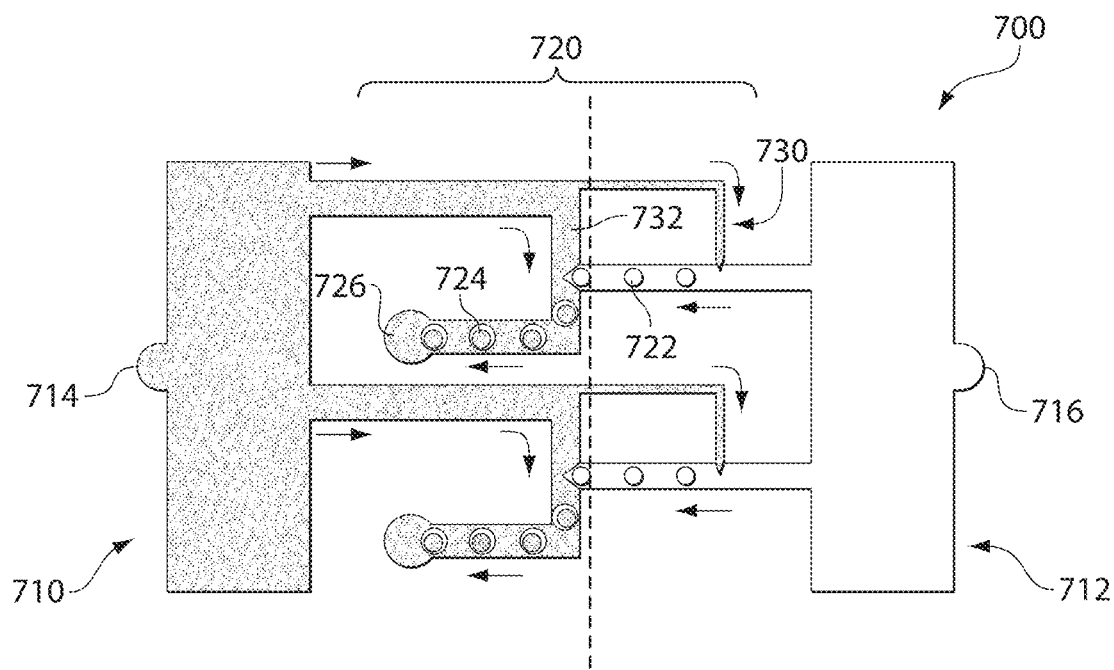
FIG. 10 is a schematic illustration of a parallel microfluidic device according to an embodiment.
Figure 12:
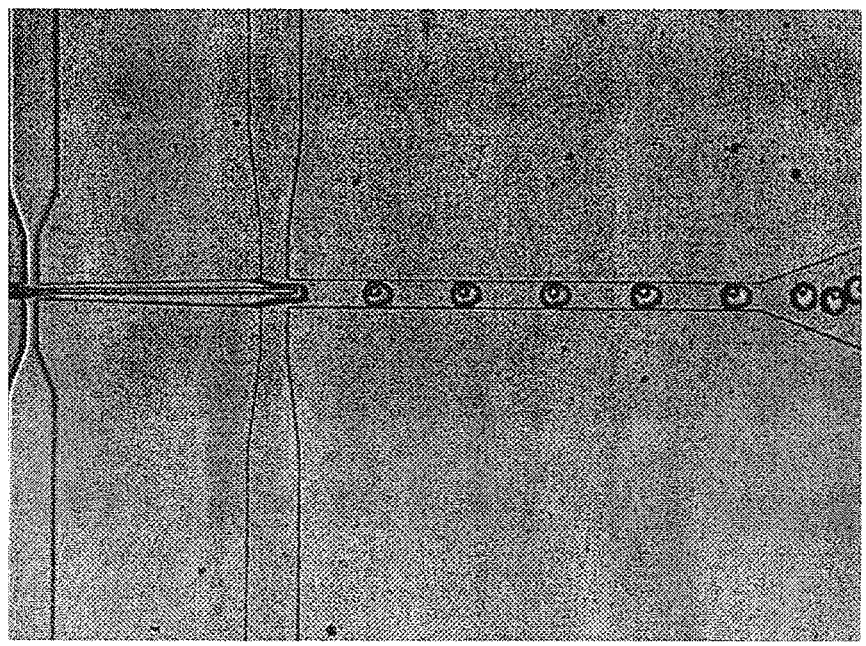
FIG. 12 is a photograph of a microfluidic device according to an embodiment.

In another non-limiting example, devices and distribution channels constructed for producing droplet-in-droplet emulsions may be fabricated in a single layer. FIG. 10 depicts one embodiment of this example and shows an array 700 with two distribution channels 710 and 712 serving two devices 720. In this example, distribution channel 710 contains a continuous phase fed by inlet 714, and distribution channel 712 contains a dispersed phase fed by inlet 716. Droplets 722 of the continuous phase are generated by flowing the continuous phase into a channel 730 containing the dispersed phase. Droplets 724, each containing a continuous phase droplet 722, are generated by flowing droplets 722 into channels 732. Droplets 724 exit the devices through outlets 726. FIG. 12 shows another embodiment of a device constructed for producing droplet-in-droplet emulsions.

Such droplets may be useful, for example, for producing particles such as core/shell-type particles. It should be understood that higher order emulsions (i.e., triple emulsions, quadruple emulsions, etc.) may also be generated using designs such as this one. For example, by flowing droplets 724 into a channel containing another phase instead of into outlet 726, a triple emulsion may be generated. For instance, an oil-water-oil emulsion may be created by flowing an oil phase into an aqueous phase to generate oil droplets suspended in the aqueous phase, flowing the oil droplets suspended in the aqueous phase into an oil phase to generate an oil-in-water emulsion suspended in the oil phase (i.e., droplets containing an oil droplet suspended in an aqueous droplet), and flowing the oil-in-water emulsion suspended in the oil phase into an aqueous phase to generate an oil-water-oil emulsion (i.e., droplets containing an oil droplet suspended in an aqueous droplet suspended in an oil droplet).

In some embodiments, one or more of the phases, such as the aqueous phase, may contain a surfactant. For example, the aqueous phase may contain sodium dodecyl sulfate. As discussed herein, the oil phase may be any suitable material. Non-limiting examples of suitable oil phases include 1-octanol and HFE-7500 oil with 1.8% (by weight) "R22" surfactant as the continuous phase [R22 is the ammonium salt of Krytox® 157 FSL oil, a commercially available perfluorinated polyether (Dupont)].

Figure 11:
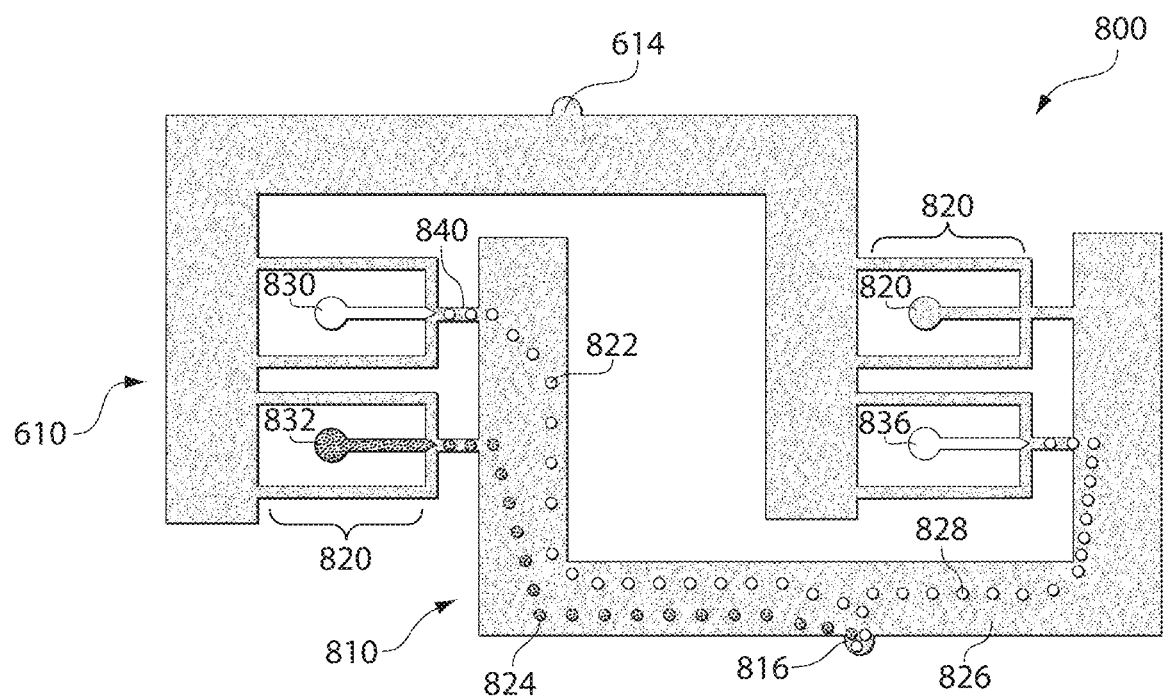
FIG. 11 is a schematic illustration of a parallel microfluidic device according to an embodiment.

In still another non-limiting example, array 650 shown in FIG. 9 may be operated differently by changing the direction of flow and the type of fluid flowing through the channels, as shown in FIG. 11. FIG. 11 illustrates array 800 with devices 820 generating four different dispersed phases surrounded by a continuous phase. (The four dispersed phases may have the same or different compositions, depending on the application.) In this example, distribution channel 610 contains a continuous phase fed by inlet 614, and collection channel 810, containing the continuous phase fed by channels 840, collects droplets 822, 824, 826, and 828, which exit channel 810 through outlet 816. Inlets 830, 832, 834, and 836 each flow a different dispersed phase into collection channel 810 through channels 840 to generate droplets 822, 824, 826, and 828, respectively. This may be used, for example, to generate libraries of different droplets in parallel. It should be understood that inlets 830, 832, 834, and 836 may flow any combination of the same or different fluids. It should be understood that the arrays shown in FIGS. 8-11 may also be parallelized in three dimensions in other embodiments.

An array, such as depicted in FIG. 11, may lead in certain cases to substantial time savings for library generation as compared to traditional methods which involve producing droplets serially in a first step and then mixing the droplets together in a separate second step. This may be advantageous, for example, when the library contains one or more sensitive compositions prone to degradation. In some cases, using a common pressure differential to drive formation of each type of droplet may improve uniformity in the size of the droplets. In certain embodiments, using a separate inlet channel for each dispersed phase can decrease the potential for contamination of the droplets as compared to instances, for example, when the same inlet channel is reused to flow different dispersed phases.

The fluid distribution article channels may be fabricated with dimensions (height, width, and/or length) much larger than the dimensions of the device microchannels, which can allow the pressure drop along the fluid distribution article channels to be essentially negligible compared to the pressure drop across each microfluidic device. As described in more detail below, such a design can prevent hydrodynamic coupling of the devices, ensure their independent and stable performance, and/or partition fluid equally between the devices. Thus, a single set of distribution channels can serve a linear array of microfluidic devices and reduce their interface to a single set of inlet/outlet apertures without substantially affecting the performance of the devices.

A fluid distribution article can be used to interface with an array of many independent microfluidic devices, thereby allowing an assembly comprising an arbitrary number of devices to be served with a single set of inlets and outlets. In some embodiments, the methods and articles of the present invention allow scaling to at least about 100 devices, at least about 1,000 devices, at least about 10,000 devices, at least about 100,000 devices, or even more.

In some cases, the devices are arranged in a high density array. For example, the spacing between devices may be less than 100 microns, less than 50 microns, less than 20 microns, less than 10 microns etc. The use of a fluid distribution article also allows denser packing of parallel devices than can be achieved using single-layer schemes since channel crossing must be avoided in single-layer schemes.

The total flow rate of fluid entering and/or exiting the assembly may be at least about 100 mL per hour, at least about 1 L per hour, at least about 10 L per hour, at least about 100 L per hour, at least about 1000 L per hour, or even more.

In one embodiment, an article of the invention is may be constructed containing a plurality of devices arranged in three dimensions (e.g. a cube-like structure). For example, such an article may contain at least 50, 100, 200, 400, 600, or even 10,000 devices. In certain instances, an article containing at least such numbers of devices may occupy a volume of less than 5 cm$^3$. The present invention discloses that a single microfluidic device may have a pressure P and that connecting a plurality of such devices also each having a pressure P using the disclosed fluid distribution articles does not cause a substantial increase in the pressure, e.g., the pressure of an article having 10,000 devices, each with pressure P may be far less than 10,000×P. In some instances, the pressure may be less than 10×P, less than 5×P, less than 2×P, etc. In certain embodiments, the pressure of a system having a plurality of devices has a pressure essentially equal to P. In this aspect of the invention, in various embodiments, an article containing a number of devices as described above, where each device has a pressure P, with a plurality of devices connected as described herein, each device having a pressure P no more than 5% different than any other pressure P, does not cause an increase in overall pressure of the overall device more than 25%, 20%, 15%, 10%, 5%, or even 2% more than P itself.

A further advantage of the present invention is that each device within an array operates essentially independently from the other devices in the array. Thus, if a device clogs or otherwise degrades, the other devices in the array can continue to operate.

An array of devices connected as described herein using a fluid distribution article also undergoes a very short turn-on transient behavior, in contrast to single-layer fan-out schemes that suffer from long-lived oscillations before steady-state operation is reached. For example, the turn-on transient behavior in a device of the present invention may be less than about 10 minutes, less than about 5 minutes, less than about 1 minute, less than about 0.1 minutes, etc.

Pressure oscillation due to hydrodynamic coupling is a common problem in microfluidic devices, particularly when elastomeric materials, such as PDMS, are used in the fabrication of the devices. For example, fluid pumped into a channel in an elastomeric microfluidic device can cause expansion and contraction of the channel thereby introducing a pressure wave in the fluid. In embodiments where the channel serves a plurality of microfluidic devices, a pressure wave can introduce fluctuations in the pressure of the fluid feeding into each of the devices connected to the channel. In some embodiments, the present invention substantially avoids these pressure fluctuations by controlling the volume of the channels feeding the devices. In some cases, a pressure change in a device may be relieved by the fluid distribution channel thereby essentially preventing the pressure change from affecting another device. For example, a fluid distribution channel connected to a first and second device that are in fluid communication with each other can allow the first and second device to be decoupled from each other.

The following tests will be useful for allowing one skilled in the art to design an array of microfluidic devices substantially without hydrodynamic coupling. For a 1-D array of N essentially identical devices connected by a distribution channel, each device has a hydrodynamic resistance value $R_d$, and the distribution channel has a hydrodynamic resistance $R_{c1}$ over the distance between adjacent devices (i.e., the resistance per segment). It is understood that the resistance may be different, but within the same order of magnitude, between inlets and outlets of a device. For example, the resistance between the oil inlet and the device outlet may be different in comparison to the resistance between the water inlet and the device outlet. If $R_{c1}$ is much less than $R_d$, the fractional difference in flow rates between the first and last devices in the array is less than $N*R_{c1}/R_d$. In some cases, this quantity is maintained below 50%, below 40%, below 30%, below 20%, below 10%, below 1%, below 0.5%, below 0.1%, etc.

For a 2-D array of M×N devices, arranged in an M×N grid with M rows of devices, each containing N devices and each row being served by its own set of first-generation linear distribution channels, the hydrodynamic resistance between the inlet of a first-generation distribution channel and the corresponding outlet is approximately $R_d/N$, assuming that $R_{c1}$ is much less than $R_d$. To deliver fluid equally to each of the M rows of devices, the second generation distribution channels should have resistance per segment $R_{c2}$ much less than $R_d/N$. In this case, the fractional difference in flow rates between the first and last rows of devices is less than $M*N*R_{c2}/R_d$. To maintain essentially equal flow per device at the same precision as for the 1-D array, the second-generation channels should be designed to have $R_{c2}<R_{c1}/M$.

Similarly, in a 3-D array of K×M×N devices, arranged in K planes of M×N grids, the third generation of channels should have resistance per segment $R_{c3}<R_{c2}/K$.

Figure 5:
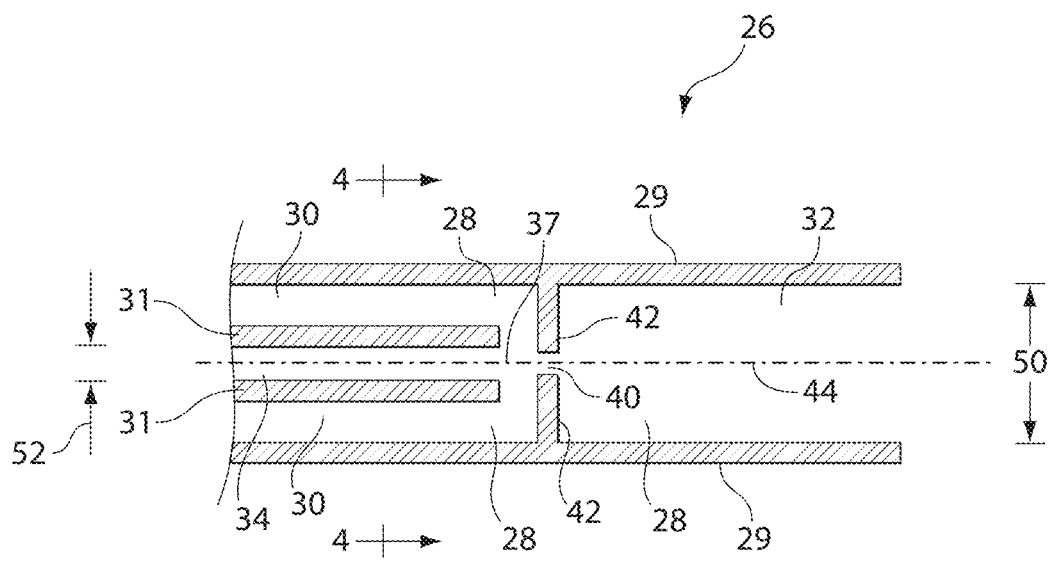
FIG. 5 is a schematic illustration of a microfluidic device of the invention according to an embodiment.
Figure 6:
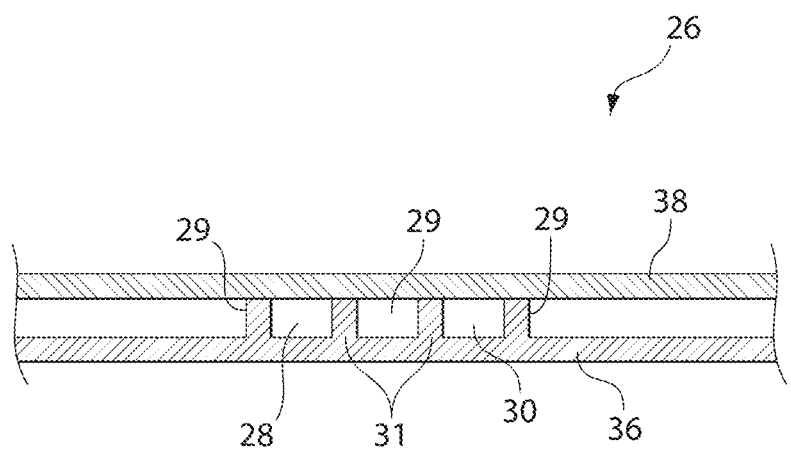
FIG. 6 is a schematic cross-sectional view through line 44 of FIG. 5.

Referring now to FIG. 5, one embodiment of the present invention, in the form of a microfluidic system 26, is illustrated schematically in cross-section (although it will be understood that a top view of system 26, absent top wall 38 of FIG. 6, would appear similar). Although "top" and "bottom" are used to define certain portions and perspectives of various systems of the invention, it is to be understood that the systems can be used in orientations different from those described. For reference, it is noted that the system is designed such that fluid flows optimally from left to right per the orientation of FIG. 5.

System 26 includes a series of walls defining regions of the microfluidic system via which the system will be described. A microfluidic interconnected region 28 is defined in the system by walls 29, and includes an upstream portion 30 and a downstream portion 32, connected to an outlet further downstream which is not shown in FIG. 5. In the embodiment illustrated in FIG. 5, a subject fluid channel 34, defined by side walls 31, is provided within the outer boundaries of interconnected region 28. Subject fluid channel 34 has an outlet 37 between upstream portion 30 and downstream portion 32 of interconnected region 28. The system is thus arranged to deliver a subject fluid from channel 34 into the interconnected region between the upstream portion and the downstream portion.

FIG. 6, a cross-sectional illustration through line 4-4 of FIG. 5 shows (in addition to some of the components shown in FIG. 5, such as walls 29 and 31) a bottom wall 36 and a top wall 38 which, together with walls 29 and 31, defining continuous region 28 (at upstream portion 30 thereof) and subject fluid channel 34. It can be seen that interconnected region 28, at upstream portion 30, includes two separate sections, separated by subject fluid channel 34. The separate sections are interconnected further downstream.

Referring again to FIG. 5, interconnected region 28 includes a dimensionally-restricted section 40 formed by extensions 42 extending from side walls 29 into the interconnected region. Fluid flowing from upstream portion 30 to downstream portion 32 of the interconnected region must pass through dimensionally-restricted section 40 in the embodiment illustrated. Outlet 37 of subject fluid channel 34 is positioned upstream of the dimensionally-restricted section. In the embodiment illustrated, the downstream portion of interconnected region 28 has a central axis 44, which is the same as the central axis of subject fluid channel 34. That is, the subject fluid channel is positioned to release subject fluid upstream of the dimensionally-restricted section, and in line with the dimensionally-restricted section. As arranged as shown in FIG. 5, subject fluid channel 34 releases subject fluid into an interior portion of interconnected region 28. That is, the outer boundaries of the interconnected region are exterior of the outer boundaries of the subject fluid channel. At the precise point at which fluid flowing downstream in the interconnected region meets fluid released from the subject fluid channel, the subject fluid is surrounded at least in part by the fluid in the interconnected region, but is not completely surrounded by fluid in the interconnected region. Instead, it is surrounded through approximately 50% of its circumference, in the embodiment illustrated. Portions of the circumference of the subject fluid are constrained by bottom wall 36 and top wall 38.

In the embodiments illustrated, the dimensionally-restricted section is an annular orifice, but it can take any of a varieties of forms. For example, it can be elongate, ovoid, square, or the like. Preferably, it is shaped in any way that causes the dispersing fluid to surround and constrict the cross-sectional shape of the subject fluid. The dimensionally-restricted section is non-valved in preferred embodiments. That is, it is an orifice that cannot be switched between an open state and a closed state, and typically is of fixed size.

Although not shown in FIGS. 5 and 6, one or more intermediate fluid channels can be provided in the arrangement of FIGS. 5 and 6 to provide an encapsulating fluid surrounding discontinuous portions of subject fluid produced by action of the dispersing fluid on the subject fluid. In one embodiment, two intermediate fluid channels are provided, one on each side of subject fluid channel 34, each with an outlet near the outlet of the subject fluid channel. In some cases, discontinuous sections of the subject fluid are created by introducing intermediate fluid between the subject fluid and the dispersing fluid, with each section surrounded by a shell of the intermediate fluid. In some embodiments, the shell is hardened. The following definitions will assist in understanding certain aspects of the invention. Also included, within the list of definitions, are sets of parameters within which certain embodiments of the invention fall.

"Channel," as used herein, means a feature on or in an article (substrate) that can at least partially confine and direct the flow of a fluid, and that has an aspect ratio (length to average cross sectional dimension) of at least 2:1, more typically at least 3:1, 5:1, or 10:1. The feature can be a groove or other indentation of any cross-sectional shape (curved, square or rectangular) and can be covered or uncovered. In embodiments where it is completely covered, at least one portion of the channel can have a cross-section that is completely enclosed, or the entire channel may be completely enclosed along its entire length with the exception of its inlet and outlet. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some cases where an open channel is used, the fluid may be held within the channel, for example, using surface tension (i.e., a concave or convex meniscus). The channel may be of any size, for example, having a largest dimension perpendicular to fluid flow of less than about 5 or 2 millimeters, or less than about 1 millimeter, or less than about 500 microns, less than about 200 microns, less than about 100 microns, or less than about 50 or 25 microns. In some cases the dimensions of the channel may be chosen such that fluid is able to freely flow through the reactor. The dimensions of the channel may also be chosen, for example, to allow a certain volumetric or linear flowrate of fluid in the channel. Of course, the number of channels and the shape of the channels can be varied by any method known to those of ordinary skill in the art. In the embodiments illustrated in the accompanying figures, all channels are completely enclosed. "Channel", as used herein, does not include a space created between a channel wall and an obstruction. Instead, obstructions, as defined herein, are understood to be contained within channels. Larger channels, tubes, etc. can be used in microfluidic device for a variety of purposes, e.g., to store fluids in bulk and to deliver fluids to components of various embodiments of the invention.

In some, but not all embodiments, all components of the systems described herein are microfluidic. "Microfluidic", as used herein, refers to a device, apparatus or system including at least one fluid channel having a cross-sectional dimension of less than 1 millimeter (mm), and a ratio of length to largest cross-sectional dimension of at least 3:1, and "microfluidic channel" is a channel meeting these criteria. Cross-sectional dimension is measured perpendicular to the direction of fluid flow. Most fluid channels in certain components of the invention have maximum cross-sectional dimensions less than 2 millimeters, and preferably 1 millimeter. In one set of embodiments, all fluid channels, at least at regions at which one fluid is dispersed by another, are microfluidic or of largest cross sectional dimension of no more than 2 millimeters. In another embodiment, all fluid channels associated with fluid dispersion, formed in part by a single component (e.g. an etched substrate or molded unit) are microfluidic or of maximum dimension of 2 millimeters. Of course, larger channels, tubes, etc. can be used to store fluids in bulk and to deliver fluids to components of other embodiments of the invention.

A "microfluidic interconnected region," as used herein, refers to a portion of a device, apparatus or system including two or more microfluidic channels in fluid communication.

The "cross-sectional dimension" of the channel is measured perpendicular to the direction of fluid flow. Most fluid channels in components of various embodiments of the invention have maximum cross-sectional dimensions less than 2 mm, and in some cases, less than 1 mm. In one set of embodiments, all fluid channels are microfluidic or have a largest cross sectional dimension of no more than 2 mm or 1 mm. In another embodiment, the fluid channels may be formed in part by a single component (e.g. an etched substrate or molded unit). Of course, larger channels, tubes, chambers, reservoirs, etc. can be used to store fluids in bulk and to deliver fluids to components of various embodiments of the invention. In one set of embodiments, the maximum cross-sectional dimension of all active fluid channels is less than 500 microns, less than 200 microns, less than 100 microns, less than 50 microns, or less than 25 microns. Devices and systems may include channels having non-microfluidic portions as well.

The fluidic droplets within the channels may have a cross-sectional dimension smaller than about 90% of an average cross-sectional dimension of the channel, and in certain embodiments, smaller than about 80%, about 70%, about 60%, about 50%, about 40%, about 30%, about 20%, about 10%, about 5%, about 3%, about 1%, about 0.5%, about 0.3%, about 0.1%, about 0.05%, about 0.03%, or about 0.01% of the average cross-sectional dimension of the channel.

As used herein, "integral" means that portions of components are joined in such a way that they cannot be separated from each other without cutting or breaking the components from each other.

A "droplet," as used herein is an isolated portion of a first fluid that is completely surrounded by a second fluid. It is to be noted that a droplet is not necessarily spherical, but may assume other shapes as well, for example, depending on the external environment. In one embodiment, the droplet has a minimum cross-sectional dimension that is substantially equal to the largest dimension of the channel perpendicular to fluid flow in which the droplet is located.

The "average diameter" of a population of droplets is the arithmetic average of the diameters of the droplets. Those of ordinary skill in the art will be able to determine the average diameter of a population of droplets, for example, using laser light scattering or other known techniques. The diameter of a droplet, in a non-spherical droplet, is the mathematically-defined average diameter of the droplet, integrated across the entire surface. As non-limiting examples, the average diameter of a droplet may be less than about 1 mm, less than about 500 micrometers, less than about 200 micrometers, less than about 100 micrometers, less than about 75 micrometers, less than about 50 micrometers, less than about 25 micrometers, less than about 10 micrometers, or less than about 5 micrometers. The average diameter of the droplet may also be at least about 1 micrometer, at least about 2 micrometers, at least about 3 micrometers, at least about 5 micrometers, at least about 10 micrometers, at least about 15 micrometers, or at least about 20 micrometers in certain cases.

As used herein, a "fluid" is given its ordinary meaning, i.e., a liquid or a gas. The fluid may have any suitable viscosity that permits flow. If two or more fluids are present, each fluid may be independently selected among essentially any fluids (liquids, gases, and the like) by those of ordinary skill in the art, by considering the relationship between the fluids. The fluids may each be miscible or immiscible. For example, two fluids can be selected to be immiscible within the time frame of formation of a stream of fluids, or within the time frame of reaction or interaction. Where the portions remain liquid for a significant period of time then the fluids should be significantly immiscible. Where, after contact and/or formation, the dispersed portions are quickly hardened by polymerization or the like, the fluids need not be as immiscible. Those of ordinary skill in the art can select suitable miscible or immiscible fluids, using contact angle measurements or the like, to carry out various techniques of the invention.

As used herein, a first entity is "surrounded" by a second entity if a closed loop can be drawn around the first entity through only the second entity. A first entity is "completely surrounded" if closed loops going through only the second entity can be drawn around the first entity regardless of direction. In one aspect, the first entity may be a cell, for example, a cell suspended in media is surrounded by the media. In another aspect, the first entity is a particle. In yet another aspect of the invention, the entities can both be fluids. For example, a hydrophilic liquid may be suspended in a hydrophobic liquid, a hydrophobic liquid may be suspended in a hydrophilic liquid, a gas bubble may be suspended in a liquid, etc. Typically, a hydrophobic liquid and a hydrophilic liquid are substantially immiscible with respect to each other, where the hydrophilic liquid has a greater affinity to water than does the hydrophobic liquid. Examples of hydrophilic liquids include, but are not limited to, water and other aqueous solutions comprising water, such as cell or biological media, ethanol, salt solutions, etc. Examples of hydrophobic liquids include, but are not limited to, oils such as hydrocarbons, silicon oils, fluorocarbon oils, organic solvents etc.

The term "determining," as used herein, generally refers to the analysis or measurement of a species, for example, quantitatively or qualitatively, or the detection of the presence or absence of the species. "Determining" may also refer to the analysis or measurement of an interaction between two or more species, for example, quantitatively or qualitatively, or by detecting the presence or absence of the interaction. Example techniques include, but are not limited to, spectroscopy such as infrared, absorption, fluorescence, UV/visible, FTIR ("Fourier Transform Infrared Spectroscopy"), or Raman; gravimetric techniques; ellipsometry; piezoelectric measurements; immunoassays; electrochemical measurements; optical measurements such as optical density measurements; circular dichroism; light scattering measurements such as quasielectric light scattering; polarimetry; refractometry; or turbidity measurements.

The invention, in some aspects, provides for formation of discontinuous, or isolated, regions of a subject fluid in a dispersing fluid, with these fluids optionally separated by one or more intermediate fluids. These fluids can be selected among essentially any fluids (liquids, gases, and the like) by those of ordinary skill in the art, by considering the relationship between the fluids. For example, the subject fluid and the dispersing fluid are selected to be immiscible within the timescale of formation of the dispersed portions. Where the dispersed portions remain liquid for a significant period of time, the fluids should be significantly immiscible. Where, after formation of dispersed portions, the dispersed portions are quickly hardened by polymerization or the like, the fluids need not be as immiscible. Those of ordinary skill in the art can select suitable immiscible fluids, using contact angle measurements or the like, to carry out various techniques of the invention.

In some embodiments, a discontinuous section has a maximum dimension, and the size ratio of the section having the largest maximum dimension to that having the smallest maximum dimension is at least 10:1, at least 25:1, at least 50:1, at least 100:1, etc. The discontinuous sections may have a maximum cross-sectional dimension of less than 50 microns, less than 25 microns, less than 10 microns, less than 5 microns, less than 1 micron, and so on.

Subject fluid dispersion can be controlled by those of ordinary skill in the art, based on the teachings herein, as well as available teachings in the field of flow-focusing. Reference can be made, for example, to "Generation of Steady Liquid Microthreads and Micron-Sized Monodispersed Sprays and Gas Streams," *Phys. Rev. Lett.*, 80:2, Jan. 12, 1998, Ganan-Calvo, as well as numerous other texts, for selection of fluids to carry out the purposes of various embodiments of the invention. As will be more fully appreciated from the examples below, control of dispersing fluid flow rate, and ratio between the flow rates of dispersing and subject fluids, can be used to control subject fluid stream and/or dispersion size, and monodispersity versus polydispersity in fluid dispersions. The microfluidic devices of the present invention, coupled with flow rate and ratio control as taught herein, allow significantly improved control and range. The size of the dispersed portion can range down to less than one micron in diameter. In some embodiments, the ratio of the flow rate of the subject fluid to the dispersing fluid is less than 1:5, less than 1:25, less than 1:50, less than 1:100, less than 1:250, less than 1:400, etc. The flow rate of the dispersing fluid within a microfluidic channel can be any suitable rate. For example, the flow rate may be between $6\times10^{-5}$ and $1\times10^{-2}$ milliliters per second, $1\times10^{-4}$ and $1\times10^{-3}$ milliliters per second, and the like.

Many dispersions have bulk properties (e.g. rheology; how the dispersion(s) flows, and optionally other properties such as optical properties, taste, feel, etc., influenced by the dispersion size and the dispersion size distribution. Typical prior art techniques, such as prior art flow focusing techniques, most commonly involve monodisperse systems. The present invention also involves control of conditions that bidisperse and polydisperse discontinuous section distributions result, and this can be useful when influencing the bulk properties by altering the discontinuous size distribution, etc.

The invention, in some embodiments, can be used to form a variety of dispersed fluid sections or particles for use in medicine (e.g., pharmaceuticals), skin care products (e.g. lotions, shower gels), foods (e.g. salad dressings, ice cream), ink encapsulation, paint, micro-templating of micro-engineered materials (e.g., photonic crystals, smart materials, etc.), foams, and the like. Highly monodisperse and concentrated liquid crystal droplets produced according to various embodiments of the invention can self-organize into two and three dimensional structures, and these can be used in, for example, novel optical devices.

In some embodiments, a gas-liquid dispersion may be formed to create a foam. As the volume percent of a gas in a gas-liquid dispersion increases, individual gas bubbles may lose their spherical shape as they are forced against each other. If constrained by one or more surfaces, these spheres may be compressed to disks, but will typically maintain a circular shape pattern when viewed through the compressing surface. Typically, a dispersion is called a foam when the gas bubbles become non-spherical, or polygonal, at higher volume percentages. Although many factors, for example, dispersion size, viscosity, and surface tension may affect when a foam is formed, in some embodiments, foams form (non-spherical bubbles) when the volume percent of gas in the gas-liquid dispersion exceeds, for example, 75, 80, 85, 90 or 95.

A variety of materials and methods can be used to form components of the system, according to one set of embodiments of the present invention. In some cases various materials selected lend themselves to various methods. For example, components of certain embodiments of the invention can be formed from solid materials, in which the channels can be formed via micromachining, film deposition processes such as spin coating and chemical vapor deposition, laser fabrication, photolithographic techniques, etching methods including wet chemical or plasma processes, and the like. See, for example, Angell, et al., Scientific American 248:44-55 (1983). In one embodiment, at least a portion of the system is formed of silicon by etching features in a silicon chip. Technology for precise and efficient fabrication of devices of various embodiments of the invention from silicon is known. In another embodiment that section (or other sections) can be formed of a polymer, and can be an elastomeric polymer, or polytetrafluoroethylene (PTFE; Teflon®), or the like.

Different components can be fabricated of different materials. For example, a base portion of a microfluidic device including a bottom wall and side walls can be fabricated from an opaque material such as silicon or PDMS, and a top portion, or cover, can be fabricated from a transparent material such as glass or a transparent polymer, for observation and control of the fluidic process. Components can be coated so as to expose a desired chemical functionality to fluids that contact interior channel walls, where base supporting material does not have the precise, desired functionality. For example, components can be fabricated as illustrated, with interior channel walls coated with another material.

Material used to fabricate various devices of the invention, or material used to coat interior walls of fluid channels, may desirably be selected from among those materials that will not adversely affect or be affected by fluid flowing through the device, e.g., material(s) that is chemically inert in the presence of fluids at working temperatures and pressures that are to be used within the device.

In one embodiment, certain components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid art that can be induced to solidify, or that spontaneously solidifies, into a solid capable of containing and transporting fluids contemplated for use in and with the microfluidic network structures. In one embodiment, the hardenable fluid comprises a polymeric liquid or a liquid polymeric precursor (i.e. a "prepolymer"). Suitable polymeric liquids can include, for example, thermoplastic polymers, thermoset polymers, or mixture of such polymers heated above their melting point; or a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Examples of silicone elastomers suitable for use according to certain embodiments of the invention include those formed from precursors including the chlorosilanes such as methylchlorosilanes, ethylchlorosilanes, and phenylchlorosilanes, and the like.

Silicone polymers are preferred in one set of embodiments, for example, the silicone elastomer polydimethylsiloxane (PDMS). Exemplary polydimethylsiloxane polymers include those sold under the trademark Sylgard by Dow Chemical Co., Midland, Mich., and particularly Sylgard 182, Sylgard 184, and Sylgard 186. Silicone polymers including PDMS have several beneficial properties simplifying fabrication of the microfluidic structures of certain embodiments of the invention. For instance, such materials are inexpensive, readily available, and can be solidified from a prepolymeric liquid via curing with heat. For example, PDMSs are typically curable by exposure of the prepolymeric liquid to temperatures of about, for example, 65° C. to about 75° C. for exposure times of about, for example, 1 hour. Also, silicone polymers, such as PDMS, can be elastomeric and thus may be useful for forming very small features with relatively high aspect ratios, necessary in certain embodiments of the invention. Flexible (e.g. elastomeric) molds or masters can be advantageous in this regard.

One advantage of forming structures such as microfluidic structures of various embodiments of the invention from silicone polymers, such as PDMS, is the ability of such polymers to be oxidized, for example by exposure to an oxygen-containing plasma such as an air plasma, so that the oxidized structures contain at their surface chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in Duffy et al., Rapid Prototyping of Microfluidic Systems and Polydimethylsiloxane, Analytical Chemistry, Vol. 70, pages 474-480, 1998, incorporated herein by reference.

Another advantage to forming microfluidic structures of various embodiments of the invention (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials. Thus, certain devices of the invention can be made with surfaces that are more hydrophilic than unoxidized elastomeric polymers.

In some embodiments, it may be desirable to make a channel surface hydrophobic. One non-limiting method for making a channel surface hydrophobic comprises contacting the channel surface with an agent that confers hydrophobicity to the channel surface. For example, in some embodiments, a channel surface may be contacted (e.g., flushed) with Aquapel (a commercial auto glass treatment) (PPG Industries, Pittsburgh, Pa.). In some embodiments, a channel surface contacted with an agent that confers hydrophobicity may be subsequently purged with air. In some embodiments, the channel may be heated (e.g., baked) to evaporate solvent that contains the agent that confers hydrophobicity.

Thus, in one aspect of the invention, a surface of a microfluidic channel may be modified to facilitate the production of emulsions such as multiple emulsions. In some cases, the surface may be modified by coating a sol-gel onto at least a portion of a microfluidic channel. As is known to those of ordinary skill in the art, a sol-gel is a material that can be in a sol or a gel state, and typically includes polymers. The gel state typically contains a polymeric network containing a liquid phase, and can be produced from the sol state by removing solvent from the sol, e.g., via drying or heating techniques. In some cases, as discussed below, the sol may be pretreated before being used, for instance, by causing some polymerization to occur within the sol.

In some embodiments, the sol-gel coating may be chosen to have certain properties, for example, having a certain hydrophobicity. The properties of the coating may be controlled by controlling the composition of the sol-gel (for example, by using certain materials or polymers within the sol-gel), and/or by modifying the coating, for instance, by exposing the coating to a polymerization reaction to react a polymer to the sol-gel coating, as discussed below.

For example, the sol-gel coating may be made more hydrophobic by incorporating a hydrophobic polymer in the sol-gel. For instance, the sol-gel may contain one or more silanes, for example, a fluorosilane (i.e., a silane containing at least one fluorine atom) such as heptadecafluorosilane, or other silanes such as methyltriethoxy silane (MTES) or a silane containing one or more lipid chains, such as octadecylsilane or other $CH_3(CH_2)_n$— silanes, where n can be any suitable integer. For instance, n may be greater than 1, 5, or 10, and less than about 20, 25, or 30. The silanes may also optionally include other groups, such as alkoxide groups, for instance, octadecyltrimethoxysilane. In general, most silanes can be used in the sol-gel, with the particular silane being chosen on the basis of desired properties such as hydrophobicity. Other silanes (e.g., having shorter or longer chain lengths) may also be chosen in other embodiments of the invention, depending on factors such as the relative hydrophobicity or hydrophilicity desired. In some cases, the silanes may contain other groups, for example, groups such as amines, which would make the sol-gel more hydrophilic. Non-limiting examples include diamine silane, triamine silane, or N-[3-(trimethoxysilyl)propyl] ethylene diamine silane. The silanes may be reacted to form oligomers or polymers within the sol-gel, and the degree of polymerization (e.g., the lengths of the oligomers or polymers) may be controlled by controlling the reaction conditions, for example by controlling the temperature, amount of acid present, or the like. In some cases, more than one silane may be present in the sol-gel. For instance, the sol-gel may include fluorosilanes to cause the resulting sol-gel to exhibit greater hydrophobicity, and other silanes (or other compounds) that facilitate the production of polymers. In some cases, materials able to produce $SiO_2$ compounds to facilitate polymerization may be present, for example, TEOS (tetraethyl orthosilicate).

It should be understood that the sol-gel is not limited to containing only silanes, and other materials may be present in addition to, or in place of, the silanes. For instance, the coating may include one or more metal oxides, such as $SiO_2$, vanadia ($V_2O_5$), titania ($TiO_2$), and/or alumina ($Al_2O_3$).

In some instances, the microfluidic channel is constructed from a material suitable to receive the sol-gel, for example, glass, metal oxides, or polymers such as polydimethylsiloxane (PDMS) and other siloxane polymers. For example, in some cases, the microfluidic channel may be one in which contains silicon atoms, and in certain instances, the microfluidic channel may be chosen such that it contains silanol (Si—OH) groups, or can be modified to have silanol groups. For instance, the microfluidic channel may be exposed to an oxygen plasma, an oxidant, or a strong acid cause the formation of silanol groups on the microfluidic channel.

The sol-gel may be present as a coating on the microfluidic channel, and the coating may have any suitable thickness. For instance, the coating may have a thickness of no more than about 100 micrometers, no more than about 30 micrometers, no more than about 10 micrometers, no more than about 3 micrometers, or no more than about 1 micrometer. Thicker coatings may be desirable in some cases, for instance, in applications in which higher chemical resistance is desired. However, thinner coatings may be desirable in other applications, for instance, within relatively small microfluidic channels.

In one set of embodiments, the hydrophobicity of the sol-gel coating can be controlled, for instance, such that a first portion of the sol-gel coating is relatively hydrophobic, and a second portion of the sol-gel coating is relatively hydrophobic. The hydrophobicity of the coating can be determined using techniques known to those of ordinary skill in the art, for example, using contact angle measurements such as those discussed below. For instance, in some cases, a first portion of a microfluidic channel may have a hydrophobicity that favors an organic solvent to water, while a second portion may have a hydrophobicity that favors water to the organic solvent.

The hydrophobicity of the sol-gel coating can be modified, for instance, by exposing at least a portion of the sol-gel coating to a polymerization reaction to react a polymer to the sol-gel coating. The polymer reacted to the sol-gel coating may be any suitable polymer, and may be chosen to have certain hydrophobicity properties. For instance, the polymer may be chosen to be more hydrophobic or more hydrophilic than the microfluidic channel and/or the sol-gel coating. As an example, a hydrophilic polymer that could be used is poly(acrylic acid).

The polymer may be added to the sol-gel coating by supplying the polymer in monomeric (or oligomeric) form to the sol-gel coating (e.g., in solution), and causing a polymerization reaction to occur between the polymer and the sol-gel. For instance, free radical polymerization may be used to cause bonding of the polymer to the sol-gel coating. In some embodiments, a reaction such as free radical polymerization may be initiated by exposing the reactants to heat and/or light, such as ultraviolet (UV) light, optionally in the presence of a photoinitiator able to produce free radicals (e.g., via molecular cleavage) upon exposure to light. Those of ordinary skill in the art will be aware of many such photoinitiators, many of which are commercially available, such as Irgacur 2959 (Ciba Specialty Chemicals) or 2-hydroxy-4-(3-triethoxysilylpropoxy)-diphenylketone (SIH6200.0, ABCR GmbH & Co. KG).

The photoinitiator may be included with the polymer added to the sol-gel coating, or in some cases, the photoinitiator may be present within the sol-gel coating. For instance, a photoinitiator may be contained within the sol-gel coating, and activated upon exposure to light. The photoinitiator may also be conjugated or bonded to a component of the sol-gel coating, for example, to a silane. As an example, a photoinitiator such as Irgacur 2959 may be conjugated to a silane-isocyanate via a urethane bond, where a primary alcohol on the photoinitiator may participate in nucleophilic addition with the isocyanate group, which may produce a urethane bond.

It should be noted that only a portion of the sol-gel coating may be reacted with a polymer, in some embodiments of the invention. For instance, the monomer and/or the photoinitiator may be exposed to only a portion of the microfluidic channel, or the polymerization reaction may be initiated in only a portion of the microfluidic channel. As a particular example, a portion of the microfluidic channel may be exposed to light, while other portions are prevented from being exposed to light, for instance, by the use of masks or filters. Accordingly, different portions of the microfluidic channel may exhibit different hydrophobicities, as polymerization does not occur everywhere on the microfluidic channel. As another example, the microfluidic channel may be exposed to UV light by projecting a de-magnified image of an exposure pattern onto the microfluidic channel. In some cases, small resolutions (e.g., 1 micrometer, or less) may be achieved by projection techniques.

Another aspect of the present invention is generally directed at systems and methods for coating such a sol-gel onto at least a portion of a microfluidic channel. In one set of embodiments, a microfluidic channel is exposed to a sol, which is then treated to form a sol-gel coating. In some cases, the sol can also be pretreated to cause partial polymerization to occur. Extra sol-gel coating may optionally be removed from the microfluidic channel. In some cases, as discussed, a portion of the coating may be treated to alter its hydrophobicity (or other properties), for instance, by exposing the coating to a solution containing a monomer and/or an oligomer, and causing polymerization of the monomer and/or oligomer to occur with the coating.

The sol may be contained within a solvent, which can also contain other compounds such as photoinitiators including those described above. In some cases, the sol may also comprise one or more silane compounds. The sol may be treated to form a gel using any suitable technique, for example, by removing the solvent using chemical or physical techniques, such as heat. For instance, the sol may be exposed to a temperature of at least about 150° C., at least about 200° C., or at least about 250° C., which may be used to drive off or vaporize at least some of the solvent. As a specific example, the sol may be exposed to a hotplate set to reach a temperature of at least about 200° C. or at least about 250° C., and exposure of the sol to the hotplate may cause at least some of the solvent to be driven off or vaporized. In some cases, however, the sol-gel reaction may proceed even in the absence of heat, e.g., at room temperature. Thus, for instance, the sol may be left alone for a while (e.g., about an hour, about a day, etc.), and/or air or other gases may be passed over the sol, to allow the sol-gel reaction to proceed.

In some cases, any ungelled sol that is still present may be removed from the microfluidic channel. The ungelled sol may be actively removed, e.g., physically, by the application of pressure or the addition of a compound to the microfluidic channel, etc., or the ungelled sol may be removed passively in some cases. For instance, in some embodiments, a sol present within a microfluidic channel may be heated to vaporize solvent, which builds up in a gaseous state within the microfluidic channels, thereby increasing pressure within the microfluidic channels. The pressure, in some cases, may be enough to cause at least some of the ungelled sol to be removed or "blown" out of the microfluidic channels.

In certain embodiments, the sol is pretreated to cause partial polymerization to occur, prior to exposure to the microfluidic channel. For instance, the sol may be treated such that partial polymerization occurs within the sol. The sol may be treated, for example, by exposing the sol to an acid or temperatures that are sufficient to cause at least some gellation to occur. In some cases, the temperature may be less than the temperature the sol will be exposed to when added to the microfluidic channel. Some polymerization of the sol may occur, but the polymerization may be stopped before reaching completion, for instance, by reducing the temperature. Thus, within the sol, some oligomers may form (which may not necessarily be well-characterized in terms of length), although full polymerization has not yet occurred. The partially treated sol may then be added to the microfluidic channel, as discussed above.

In certain embodiments, a portion of the coating may be treated to alter its hydrophobicity (or other properties) after the coating has been introduced to the microfluidic channel. In some cases, the coating is exposed to a solution containing a monomer and/or an oligomer, which is then polymerized to bond to the coating, as discussed above. For instance, a portion of the coating may be exposed to heat or to light such as ultraviolet right, which may be used to initiate a free radical polymerization reaction to cause polymerization to occur. Optionally, a photoinitiator may be present, e.g., within the sol-gel coating, to facilitate this reaction.

Additional details of such coatings and other systems may be seen in U.S. Provisional Patent Application Ser. No. 61/040,442, filed Mar. 28, 2008, entitled "Surfaces, Including Microfluidic Channels, With Controlled Wetting Properties," by Abate, et al.; and an International Patent Application filed Feb. 11, 2009, entitled "Surfaces, Including Microfluidic Channels, With Controlled Wetting Properties," by Abate, et al., each incorporated herein by reference in their entireties.

In one embodiment, a bottom wall is formed of a material different from one or more side walls or a top wall, or other components. For example, the interior surface of a bottom wall can comprise the surface of a silicon wafer or microchip, or other substrate. Other components can, as described above, be sealed to such alternative substrates. Where it is desired to seal a component comprising a silicone polymer (e.g. PDMS) to a substrate (bottom wall) of different material, it is preferred that the substrate be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques can be used, as would be apparent to those of ordinary skill in the art, including, but not limited to, the use of separate adhesives, thermal bonding, solvent bonding, ultrasonic welding, etc.

In another embodiment, the present invention generally relates to systems and methods for creating emulsions, including multiple emulsions. In some cases, emulsions, including multiple emulsions, may be created through a "triggering" process, where a fluidic droplet or other entity is used to create one or more nestings of droplets containing the fluidic droplet or other entity. In such a manner, multiple emulsions may be formed in some cases, e.g., triple emulsions, quadruple emulsions, quintuple emulsions, etc. In certain embodiments, a first droplet (or other entity) is used to "plug" a channel; fluid pooling behind the droplet pushes the droplet through the channel to form the emulsion. This process may be repeated to create multiple emulsions in some cases. Other aspects of the present invention generally relate to systems for producing such emulsions, methods of using such emulsions, methods of promoting such emulsions, or the like.

Thus, in certain embodiments, the present invention generally relates to emulsions, including multiple emulsions, and to methods and apparatuses for making such emulsions. A "multiple emulsion," as used herein, describes larger droplets that contain one or more smaller droplets therein. The larger droplets may be suspended in a third fluid. In certain embodiments, larger degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. As described below, multiple emulsions can be formed in certain embodiments with generally precise repeatability.

Fields in which emulsions or multiple emulsions may prove useful include, for example, food, beverage, health and beauty aids, paints and coatings, and drugs and drug delivery. For instance, a precise quantity of a drug, pharmaceutical, or other agent can be contained within an emulsion, or in some instances, cells can be contained within a droplet, and the cells can be stored and/or delivered. Other species that can be stored and/or delivered include, for example, biochemical species such as nucleic acids such as siRNA, RNAi and DNA, proteins, peptides, or enzymes, or the like. Additional species that can be incorporated within an emulsion include, but are not limited to, nanoparticles, quantum dots, fragrances, proteins, indicators, dyes, fluorescent species, chemicals, or the like. An emulsion can also serve as a reaction vessel in certain cases, such as for controlling chemical reactions, or for in vitro transcription and translation, e.g., for directed evolution technology.

Using the methods and devices described herein, in some embodiments, an emulsion having a consistent size and/or number of droplets can be produced, and/or a consistent ratio of size and/or number of outer droplets to inner droplets (or other such ratios) can be produced for cases involving multiple emulsions. For example, in some cases, a single droplet within an outer droplet of predictable size can be used to provide a specific quantity of a drug. In addition, combinations of compounds or drugs may be stored, transported, or delivered in a droplet. For instance, hydrophobic and hydrophilic species can be delivered in a single, multiple emulsion droplet, as the droplet can include both hydrophilic and hydrophobic portions. The amount and concentration of each of these portions can be consistently controlled according to certain embodiments of the invention, which can provide for a predictable and consistent ratio of two or more species in a multiple emulsion droplet.

In one aspect, an emulsion may be created through a "triggering" process, where a droplet or other entity is used to create one or more nestings of fluidic droplets containing the droplet or other entity. Other entities besides fluidic droplets, for instance, cells or gel particles, may also be used in certain embodiments.

More generally, various aspects of the invention are directed to systems and methods for creating emulsions, including multiple emulsions, using a process in which a deformable entity, such as a fluidic droplet or a gel, at least partially plugs an outlet channel, where the creation of a droplet containing the deformable entity is "triggered" by pushing the deformable entity into the outlet channel. The outlet channel may be, for instance, a microfluidic channel, as is discussed below. Typically, droplet formation cannot occur without this partial plugging (although there may be a relatively low "error" rate in some embodiments), and so the formation of the droplet is said to be "triggered" by creating and releasing the partial plug of the deformable entity into the outlet channel.

As used herein, a "deformable entity" is any entity able to at least partially plug an outlet channel, where a carrying fluid containing the deformable entity cannot flow past the deformable entity into the outlet channel while the deformable entity at least partially plugs the outlet channel. In some cases, the "plugging" may be complete, i.e., viewing the outlet channel in cross-section, it is not possible for a molecule of the carrying fluid to flow through the outlet channel without crossing the deformable entity. However, in other cases, the plugging may be partial, such that it is theoretically possible for a molecule to enter into the outlet channel without crossing the deformable entity, although the carrying fluid may still be prevented from entering into the outlet channel due to effects such as viscosity, hydrophobic repulsion, charge repulsion, or the like.

Other examples may be seen in U.S. Provisional Application No. 61/160,020, filed on Mar. 13, 2009, entitled "Controlled Creation of Emulsions, Including Multiple Emulsions," by Weitz, et al., incorporated herein by reference.

The following documents are incorporated herein by reference: U.S. patent application Ser. No. 08/131,841, filed Oct. 4, 1993, entitled "Formation of Microstamped Patterns on Surfaces and Derivative Articles," by Kumar, et al., now U.S. Pat. No. 5,512,131, issued Apr. 30, 1996; priority to International Patent Application No. PCT/US96/03073, filed Mar. 1, 1996, entitled "Microcontact Printing on Surfaces and Derivative Articles," by Whitesides, et al., published as WO 96/29629 on Jun. 26, 1996; U.S. patent application Ser. No. 09/004,583, filed Jan. 8, 1998, entitled "Method of Forming Articles Including Waveguides via Capillary Micromolding and Microtransfer Molding," by Kim, et al., now U.S. Pat. No. 6,355,198, issued Mar. 12, 2002; International Patent Application No. PCT/US01/16973, filed May 25, 2001, entitled "Microfluidic Systems including Three-Dimensionally Arrayed Channel Networks," by Anderson, et al., published as WO 01/89787 on Nov. 29, 2001; S. Provisional Patent Application Ser. No. 60/392,195, filed Jun. 28, 2002, entitled "Multiphase Microfluidic System and Method," by Stone, et al.; U.S. Provisional Patent Application Ser. No. 60/424,042, filed Nov. 5, 2002, entitled "Method and Apparatus for Fluid Dispersion," by Link, et al.; U.S. Provisional Patent Application Ser. No. 60/461,954, filed Apr. 10, 2003, entitled "Formation and Control of Fluidic Species," by Link, et al.; International Patent Application No. PCT/US03/20542, filed Jun. 30, 2003, entitled "Method and Apparatus for Fluid Dispersion," by Stone, et al., published as WO 2004/002627 on Jan. 8, 2004; U.S. Provisional Patent Application Ser. No. 60/498,091, filed Aug. 27, 2003, entitled "Electronic Control of Fluidic Species," by Link, et al.; international Patent Application No. PCT/US2004/010903, filed Apr. 9, 2004, entitled "Formation and Control of Fluidic Species," by Link, et al., published as WO 2004/091763 on Oct. 28, 2004; International Patent Application No. PCT/US2004/027912, filed Aug. 27, 2004, entitled "Electronic Control of Fluidic Species," by Link, et al., published as WO 2005/021151 on Mar. 10, 2005; U.S. patent application Ser. No. 11/024,228, filed Dec. 28, 2004, entitled "Method and Apparatus for Fluid Dispersion," by Stone, et al., published as U.S. Patent Application Publication No. 2005-0172476 on Aug. 11, 2005; U.S. Provisional Patent Application Ser. No. 60/659,045, filed Mar. 4, 2005, entitled "Method and Apparatus for Forming Multiple Emulsions," by Weitz, et al.; U.S. Provisional Patent Application Ser. No. 60/659,046, filed Mar. 4, 2005, entitled "Systems and Methods of Forming Particles," by Garstecki, et al.; and U.S. patent application Ser. No. 11/246,911, filed Oct. 7, 2005, entitled "Formation and Control of Fluidic Species," by Link, et al.

The function and advantage of these and other embodiments of the present invention will be more fully understood from the examples below. The following examples are intended to illustrate the benefits of the present invention, but do not exemplify the full scope of the invention.

Example 1

This example demonstrates the fabrication of a parallel drop formation system.

An array of microfluidic drop formation devices was fabricated from PDMS (polydimethylsiloxane) using standard multilayer soft lithography. The fluidic channels were arranged in a PDMS layer to have solid walls and ceilings but open floors. Fabrication of the channels was completed by bonding the channel-containing layer to a base of glass or PDMS. A channel in one layer can be connected to a channel in an adjacent layer by punching a hole in the ceiling of the lower layer channel.

In this example, the bottom-most layer contains an array of microfluidic devices, which are not connected together within this layer. This device layer was plasma bonded to a glass slide coated with a thin layer of cured PDMS elastomer.

On top of the device layer was bonded a first distribution channel layer containing an array of fluidic channels, with spacing that matches that of the inlets in the device layer and with sufficient length to cover the full row of devices. This single first channel layer constituted the fluid distribution article for a 1-D array of devices.

Figure 7:
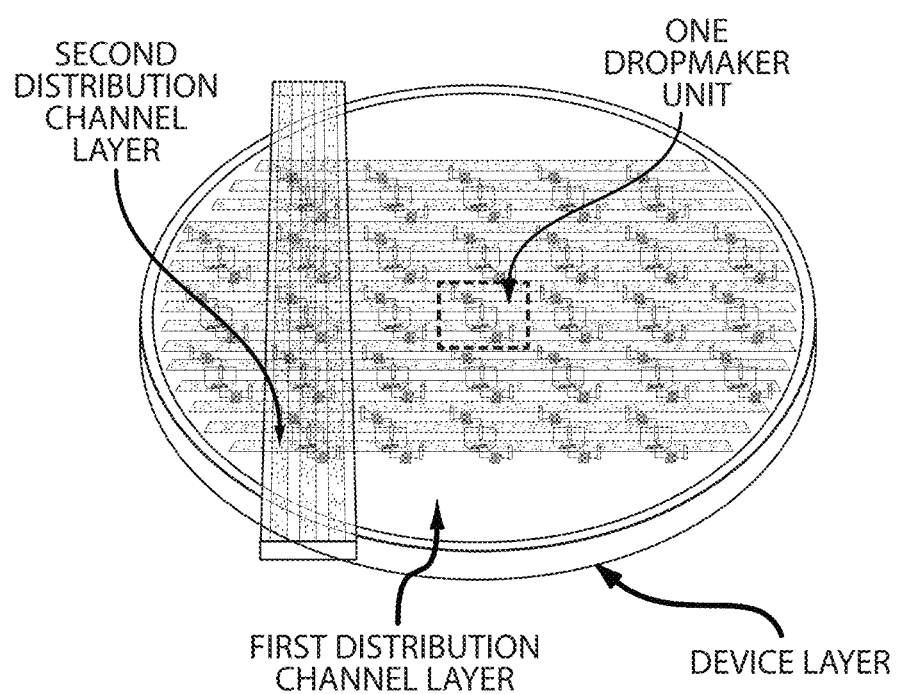
FIG. 7 is a photograph of a two-dimensional parallel microfluidic device according to an embodiment.

For a 2-D array of devices, a second channel layer was bonded above the first, with a set of channels running perpendicularly to the lower set and with appropriate length and spacing to cover the inlets and outlets of the lower channels as shown in FIG. 7.

To make a 3-D array of devices, several 2-D arrays and fluid distribution articles were stacked in the following sequence (building upwards from a glass slide): glass slide for bottom-most rigid support; solid spacer layer; device layer; fluid distribution article comprising a first channel layer and a second perpendicular channel layer; second sequence of solid spacer layer; device layer; fluid distribution article; and so on, for an arbitrary number of iterations. The fluid distribution articles are served by a set of distribution channels perpendicular to the device layers.

The assembled device array was operated by supplying fluids through polyethylene surgical tubing using a syringe pump.

Example 2

This example demonstrates the calculation of channel dimensions for a parallel microfluidic device.

As a sample calculation, the desirable channel dimensions to serve a 5×5 array of T-junctions producing simple emulsion droplets was estimated using the following equation, which is known in the art:

$$R=[(12*\mu*L)/(w*h^3)]*\{[1-[(192/\pi^5)*(h/w)]]^{-1}\},$$

where "R" is the resistance in a rectangular microchannel, "$\mu$" is the fluid viscosity, "L" is the channel length, "w" is the channel width, and "h" is the channel height. T-junctions with channel length 4000 μm, width 50 μm, and height 25 μm, have resistance of about 100 kPa*s/μL assuming a viscosity of μ=1 mPa*s. If the first-generation distribution channels have height 150 μm, width 1500 μm, and the distance between adjacent devices is 10,000 μm, then the resistance per segment is $R_{c1}$=0.2 kPa*s/μL. This affords equal flow division between the 5 devices at the 1% accuracy level. For the second-generation distribution channels, increasing the height to 250 µm and keeping the other dimensions the same gives $R_{c2}$=0.04 kPa*s/µL, which again affords equal flow division at the 1% level.

Example 3

This example demonstrates parallelization of double emulsion formation.

Each dropmaking unit included two sequential cross junctions as shown in FIG. 12. An array of units was molded in one monolithic block of PDMS using standard soft lithography. Inlet and outlet holes were hand-punched, and plasma bonding was used to seal the microchannels to a glass base plate. Plasma bonding was again used to seal a layer of distribution channels onto the array. To make the channel surfaces in the devices hydrophobic for drop formation, the assembled device was flushed with Aquapel (a commercial auto glass treatment) and purged with air. The device was baked for several hours to dry the remaining Aquapel.

To produce double emulsions, the following fluids were injected through the distribution channels: 1-octanol as the innermost phase, water with 0.5% (by weight) sodium dodecyl sulfate ("SDS", a surfactant) as the shell phase, and HFE-7500 oil with 1.8% (by weight) "R22" surfactant as the continuous phase (R22 is the ammonium salt of Krytox 157 FSL oil, a commercially available perfluorinated polyether). The total flow rates used were 250 microliters per hour for the innermost phase, 1000 microliters per hour for the shell phase, and 4000 microliters per hour for the continuous phase. Double emulsions of different sizes could be formed by changing the flow rates and/or by using devices with different sized microchannels. The distribution channels can be adjusted for these cases, for example by using a calculation as in Example 2. Those of ordinary skill in the art will recognize that auxiliary components, not shown or described in detail herein, are useful in implementing the invention. For example, sources of various fluids, means for controlling pressures and/or flow rates of these fluids as delivered to channels shown herein, etc. Those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising", "including", "carrying", "having", "containing", "involving", "composed of", "made of", "formed of" and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A system for forming droplets in microfluidic channels, comprising:
   a first plane comprising: a plurality of microfluidic interconnected regions comprising said microfluidic channels, configured for droplet formation, wherein a microfluidic interconnected region of said plurality of microfluidic interconnected regions is fluidically connected to a subject fluid source, a dispersing fluid source, and a first droplet outlet channel; and
   a second plane configured for fluid distribution, comprising a common droplet outlet channel fluidically connected to said first droplet outlet channel,
   wherein said second plane is different from said first plane.

2. The system of claim 1, wherein said second plane is substantially perpendicular to said first plane.

3. The system of claim 1, further comprising a third plane comprising an additional plurality of microfluidic interconnected regions configured for additional droplet formation, wherein said additional plurality of microfluidic interconnected regions is fluidically connected to said subject fluid source, said dispersing fluid source, and a second droplet outlet channel, wherein said second droplet outlet channel is fluidically connected to said common droplet outlet channel, wherein said third plane is different from said first plane and said second plane.

4. The system of claim 3, wherein said first plane and said third plane are substantially parallel.

5. The system of claim 3, wherein a subject fluid distribution channel is fluidically connected to said subject fluid source, wherein said subject fluid source is in said second plane.

6. The system of claim 5, wherein said subject fluid distribution channel is in a fourth plane that is different from said first plane, said second plane and said third plane.

7. The system of claim 6, wherein said fourth plane is substantially parallel to said first plane.

8. The system of claim 5, wherein said subject fluid distribution channel is fluidically connected to at least two subject fluid channels.

9. The system of claim 8, wherein said at least two subject fluid channels are in said first plane.

10. The system of claim 9, wherein said at least two subject fluid channels are fluidically connected to at least two microfluidic interconnected regions of said plurality of microfluidic interconnected regions in said first plane.

11. The system of claim 10, wherein said plurality of microfluidic interconnected regions in said first plane are positioned in a first array of interconnected regions and a second array of interconnected regions, wherein said first array of interconnected regions is fluidically connected to said first droplet outlet channel via a first array droplet outlet channel and said second array of interconnected regions is fluidically connected to said first droplet outlet channel via a second array droplet outlet channel.

12. The system of claim 5, further comprising a second subject fluid distribution channel in said third plane that is fluidically connected to said subject fluid source, wherein said subject fluid distribution channel and said second subject fluid distribution channel are fluidically connected to a common subject fluid distribution channel in said second plane.

13. The system of claim 3, said dispersing fluid source is fluidically connected to a dispersing fluid distribution channel that is fluidically connected to at least one interconnected region of said plurality of interconnected regions in said first plane.

14. The system of claim 13, wherein said dispersing fluid distribution channel is in a fourth plane that is different from said first plane, said second plane and said third plane.

15. The system of claim 14, wherein said fourth plane is substantially parallel to said first plane.

16. The system of claim 1, wherein said at least two dispersing fluid channels are fluidically connected to at least two microfluidic interconnected regions of said plurality of microfluidic interconnected regions in said first plane.

17. The system of claim 9, wherein said dispersing fluid source comprises a common dispersing fluid distribution channel.

18. The system of claim 17, further comprising a second dispersing fluid distribution channel in said third plane, wherein said dispersing fluid distribution channel and said second dispersing fluid distribution channel are fluidically connected to said common dispersing fluid distribution channel in said second plane.

19. The system of claim 1, wherein said first droplet outlet channel is fluidically connected to at least two outlet channels.

20. The system of claim 19, wherein said at least two outlet channels are in said first plane.

21. The system of claim 1, wherein an aspect ratio of said droplet outlet channel is at least 2:1.

22. The system of claim 1, wherein said microfluidic interconnected region further comprises a dimensionally-restricted section formed by extensions extending from an outer wall of said microfluidic interconnected region into said microfluidic interconnected region, wherein said dimensionally-restricted section is positioned adjacent to an outlet of a subject fluid channel, wherein said subject fluid channel is fluidically connected to said subject fluid source.

23. The system of claim 22, wherein said microfluidic interconnected region is configured to receive a dispersing fluid from said dispersing fluid source and a subject fluid from said subject fluid source, wherein said dimensionally-restricted section has a shape which causes said dispersing fluid to surround and constrict a cross-sectional shape of said subject fluid when said subject fluid exits an outlet of said subject fluid channel.

24. The system of claim 23, wherein said dimensionally-restricted section is fixed in size.

25. The system of claim 23, wherein said dimensionally-restricted section comprises an annular orifice.

26. The system of claim 23, wherein said microfluidic interconnected region is configured such that when said subject fluid exits said outlet of said subject fluid channel, said subject fluid is surrounded by the dispersing fluid at approximately 50% of its circumference.

27. The system of claim 1, wherein said common droplet outlet channel is fluidically connected to a droplet collector.

* * * * *